United States Patent
Hatano et al.

(10) Patent No.: US 6,779,242 B2
(45) Date of Patent: Aug. 24, 2004

(54) METHOD FOR ASSEMBLING, MAGNETIC TAPE CARTRIDGE

(75) Inventors: Yasushi Hatano, Kanagawa (JP); Hidetoshi Yamamoto, Kanagawa (JP); Hideaki Shiga, Kanagawa (JP); Kouta Kitamura, Kanagawa (JP); Seiji Tsuyuki, Kanagawa (JP); Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 97 days.

(21) Appl. No.: 10/119,843

(22) Filed: Apr. 11, 2002

(65) Prior Publication Data

US 2002/0175238 A1 Nov. 28, 2002

(30) Foreign Application Priority Data

| May 31, 2001 | (JP) | 2001-164531 |
| May 31, 2001 | (JP) | 2001-164611 |
| May 24, 2001 | (JP) | 2001-154834 |
| Jun. 4, 2001 | (JP) | 2001-168081 |
| Sep. 17, 2001 | (JP) | 2001-282183 |

(51) Int. Cl.$^7$ .............................. B23P 11/02; B23Q 3/00
(52) U.S. Cl. ............................. 29/450; 29/464; 29/428
(58) Field of Search ......................... 29/450, 464, 428; 242/348

(56) References Cited

U.S. PATENT DOCUMENTS 6,407,886 B1 * 6/2002 Hashizume et al. ........ 360/132

FOREIGN PATENT DOCUMENTS

EP 0-924-702 6/1999

* cited by examiner

Primary Examiner—John C. Hong
(74) Attorney, Agent, or Firm—Sughrue Mion, PLLC

(57) ABSTRACT

A magnetic tape cartridge is provided, in which the mating of the lower half and the upper half can be easily performed and which is applicable to automated assembly, when the magnetic tape cartridge having a sliding door is assembled. The rib projects from the upper section of the first guide wall in the direction of the opposite second guide wall. On the other hand, the groove, which faces the rib, is carved on the inner side surface of the sliding door. The rib engages with the groove, thereby restricting the vertical displacement of the sliding door. Also, the engagement of the rib and the groove guides the sliding door in the guide channel freely.

2 Claims, 28 Drawing Sheets

METHOD FOR ASSEMBLING, MAGNETIC TAPE CARTRIDGE

FIELD OF THE INVENTION

The present invention relates to a magnetic tape cartridge, which has a sliding door for opening or closing the opening in order to extract a magnetic tape, and to a method for assembling the magnetic tape cartridge. It particularly relates to a magnetic tape cartridge, in which the lower half section and the upper half section can be mated easily in the assembly of the magnetic tape cartridge.

BACKGROUND OF THE INVENTION

Generally speaking, in magnetic tape cartridges used as external storage medium for data backup of computers and the likes, a single reel wound with a magnetic tape is housed in a flat square like cartridge case, which is composed of the lower half section and the upper half section. When a magnetic tape cartridge is used, the tape loading mechanism of a record playback unit extracts the magnetic tape from the cartridge case and winds it around the reel placed in the record playback unit, thereby running the magnetic tape. It explains why an opening, which is for extracting the leading end of tape, is provided on the side of the cartridge case that houses a single reel of this type. This opening is normally closed to protect against the dust, and opened by the tape loading mechanism of a record playback unit only when either recording or playback is performed by the record playback unit.

Of the magnetic tape cartridges mentioned above, the magnetic tape cartridge represented by LTO (Linear Tape Open) standard is so arranged that the sliding door, which slides along inside the side wall of the cartridge case, opens or closes the opening. The sliding door is capable of sliding smoothly fitted in the guide channels, which are provided on both inner surfaces of the upper half section and the lower half section of the cartridge along their side walls. And a spring member imposes the force on the sliding door in the closing direction to close the opening except for the occasion when the magnetic tape cartridge is in use.

The assembly of the magnetic tape cartridge with a sliding door is performed in the following manner. The respective parts such as a reel and a claw for the protection of inadvertent erasing are set on the prescribed position of the lower half section, the spring member and the sliding door are inserted into the guide channel of the lower half section, and then the lower half section and the upper half section are mated. When the spring member is inserted into the guide channel, it is mounted compressed on the sliding door so as to impose the force on the sliding door in the closing direction.

However, before the lower half section and the upper half section are mated, the sliding door 102 is liable to lift from the guide channel 103 of the lower half section 105 by the force of the spring member 101 as shown in FIG. 29, since the spring member and the sliding door, which are inserted in the guide channel, are not restricted upward. Therefore, when the lower half section 105 and the upper half section are mated without any measures, there has been a problem that the sliding door 102 is not able to be inserted properly into the guide channel 103 of the lower half section or another guide channel of the upper half section (not shown).

Also before the lower half section and the upper half section are mated, the sliding door 102 inserted in the guide channel 103 is liable to fall in the opposite of the side wall 104, namely inside the cartridge case as shown with the arrow in FIG. 30, since the guide channel 103 of the lower half section 105 is carved shallow as shown in the figure. Therefore, there has been a problem, the same as described above, that the sliding door 102 is not able to be properly inserted into the guide channel 103 of the lower half section 105 or another guide channel of the upper half section (not shown).

SUMMARY OF THE INVENTION

The object of the present invention to address the above issues is to provide a magnetic tape cartridge, in which the mating of the lower half section and the upper half section can be easily performed and is applicable to automated assembly, when the magnetic tape cartridge having a sliding door is assembled.

The first aspect of the present invention to address the above issues is to provide a magnetic tape cartridge, comprising: an opening, which is positioned on a side of a cartridge case lying across a lower half section and an upper half section of the cartridge case, for extracting a magnetic tape; and a sliding door for opening or closing the opening, which is inserted in a closed position with force imposed by a spring member into lower and upper guides, which are placed in the lower half section and the upper half section of the cartridge case respectively, wherein the sliding door and the lower guide of the lower half section are equipped with an engagement device, which is capable of restricting the vertical displacement of the sliding door and guiding the sliding door in its moving direction freely.

As the magnetic tape cartridge is arranged so that the vertical displacement of the sliding door is restricted by the engagement device, which is provided in the lower guide of the lower half section. This way the engagement device prevents the sliding door inserted in the lower guide from lifting, when the magnetic tape cartridge is assembled. It follows that the sliding door can be inserted properly into the lower guide of the lower half section, when the magnetic tape cartridge is assembled. Therefore, when the lower half section and the upper half section are mated, the mistakes associated with mating can be prevented, since the mating of the lower half section and the upper half section is improved by inserting the sliding door into the lower and upper guide channels of the lower half section and the upper half section properly. The guide according to the appended claims includes all that guides the slide movement of the sliding door, not only the lower and upper guide channels carved on the lower half section and the upper half section but also the discontinuous projections and ribs provided for the half section, the side wall and the base of the half section.

The second aspect of the present invention provides a magnetic tape cartridge, comprising: an opening, which is positioned on a side of a cartridge case lying across a lower half section and an upper half section of the cartridge case, for extracting a magnetic tape; and a sliding door for opening or closing the opening, which is inserted in a closed position with force imposed by a spring member into lower and upper guides, which are placed in the lower half section and the upper half section of the cartridge case respectively, wherein a restriction device, which restrains the sliding door from falling in the direction normal to the plane of the sliding door, is provided along the lower guide of the lower half section.

Thus, when the magnetic tape cartridge is assembled, the sliding door can be mounted properly to the lower guide of the lower half section, since the sliding door inserted in the lower guide of the lower half section can be prevented from falling in the direction normal to its plane in contact with the restriction device provided along the lower guide. Therefore, if the lower half section and the upper half section are mated, the mistakes of mating can be prevented, since the sliding door can be inserted into the lower and upper guide channels of the lower half section and the upper half section properly to result in an easy mating. The guide referred to here includes all that guides the slide movement of the sliding door, not only the lower and upper guide channels carved on the lower half section and the upper half section but also the discontinuous projections and ribs provided on the half section, the side wall and the base of the half section.

The third aspect of the present invention provides a method for assembling a magnetic tape cartridge, which comprises an opening, which is positioned on a side of a cartridge case lying across a lower half section and an upper half section of the cartridge case, for extracting a magnetic tape, and a sliding door for opening or closing the opening, which is inserted in a closed position with force imposed by a spring member into lower and upper guides placed in the lower half section and the upper half section of the cartridge case respectively, the method comprises the steps of: inserting the sliding door into the lower guide of the lower half section while the spring member is compressed; and mating the upper half section with the lower half section while the spring member or the sliding door is pressed toward a base of the lower half section.

The spring member and the sliding door are prevented from lifting and falling when they are pressed toward the base of the lower half section by a pressing means such as a finger or a small stick. So the upper half section can be easily mated with the lower half section while the sliding door is guided by the lower guide of the lower half section. If the possible lowest part of the spring member or the sliding door, which stands on the lower half section, is held and pressed, the upper half section can be mated with the lower half section more securely, since the sliding door can be held until it is guided by the upper guide of the upper half section sufficiently.

As the guides, the examples such as a line channel on the inner base surfaces of the lower half section and the upper half section, or on the contrary projections on the inner surfaces of the lower half section and the upper half section along the sliding door are presented, which restrict the movement of the sliding door. Any types of springs such as a compression coil spring, extension coil spring, torsion coil spring, laminated spring, torsion bar, spiral spring, coned disk spring and leaf spring may be employed. Their materials are not limited to metals but resins may be used instead.

In the assembly method described above, it would be preferable to press the spring member or the sliding door to the side wall of the lower half section in parallel with pressing them toward the base of the lower half section, when the upper half section is mated with the lower half section.

Assembling like this allows the mating of the upper half section with the lower half section of the magnetic tape cartridge while keeping the spring member and the sliding door standing vertically beside the side wall of the lower half section, rendering its assembly easier and resulting in the prevention of mistakes related to the mating of the upper half section and the lower half section.

Especially when the spring member is set inside the sliding door, it will be possible to assemble the magnetic tape cartridge more reliably if the spring member is pressed to the side wall of the lower half section, since the inner part (the spring member) can also press the outer part (the sliding door) to the side wall of the lower half section.

The fourth aspect of the present invention provides a method for assembling a magnetic tape cartridge case, which includes the lower half section and the upper half section, the opening lying across the lower half section and the upper half section for extracting the leading end of the magnetic tape, the sliding door for opening or closing the opening beside the inside of the side wall of the case, and the spring member imposing the force on the sliding door in the closing direction. The sliding door is mounted to the lower and upper guides on the lower half section and the upper half section while the spring member imposes the force on the sliding door. The mounting of the sliding door of the magnetic tape cartridge is performed as follows.

The sliding door is inserted into the lower guide of the lower half section with the spring member imposing the force on the sliding door. Since the sliding door is liable to fall in the direction normal to its plane without any assistance, the end of the sliding door is supported by a supporting arm with the groove of V-shape. The lower half section and the upper half section are mated while supported by the supporting arm and then the supporting arm is removed for the subsequent steps.

The sliding door is thus supported by the supporting arm, inserted in the V-shape groove. The sliding door is pressed to the slopes of the V by the spring member, thereby interposed between the slopes of the V and standing against the groove of the supporting arm. Therefore, the sliding door is prevented from falling and the mating of the lower half section and the upper half section can be performed accurately and easily. Other parts not in contact with the sliding door are not necessarily of V-shape, for the object of the V-shape groove is to interpose the end of the sliding door with the two slopes and guide it to stand stably. For example, the root of V-shape groove may be rounded with fillet and the vicinity of the opening of the V may be permitted to be of a different shape.

As the guide of the sliding door described above, the examples such as a line channel on the inner surfaces of the lower half section and the upper half section, or on the contrary projections on the inner surfaces of the lower half section and the upper half section along the sliding door can be presented, which guide the movement of the sliding door. Any types of springs such as a compression coil spring, extension coil spring, torsion coil spring, spiral spring, and leaf spring may be employed. Their materials are not limited to metals but resins may be used instead.

In the assembly method described above, it would be preferable to provide the chamfering on the end of the sliding door, which fits to the slopes of the groove mentioned above, and perform the assembly in the following manner. The sliding door is mounted on the lower half section while the spring member imposes the force on the sliding door, the lower half section and the upper half section are mated by supporting the chamfered portion with the groove and then the assembly is continued after removing the supporting arm. The chamfering may be so arranged that the end surface has a flat portion or is of an edge with large chamfering. The circular contour of the end surface of sliding door may be an alternative instead of chamfering.

The chamfered portion of the sliding door is fitted into the V-shape groove deeply and the sliding door is thereby held upright, by assembling the magnetic tape cartridge this way. Therefore, the prevention of the falling of the sliding door is more ensured, which enables the accurate and easy mating of the lower half section and the upper half section.

BRIEF DESCRIPTION OF THE DRAWINGS

FIG. 19(a) shows the L-shape stick pressing the spring member, FIG. 19(b) shows the removal of the L-shape stick.

FIG. 25(a) shows the supporting arm before supporting the end of the sliding door and FIG. 25(b) shows the supporting arm during supporting.

FIG. 26 is a perspective view for explaining the assembly process of the magnetic tape cartridge according to the twelfth embodiment.

FIG. 28 is an enlarged view showing major parts of the sliding door and the supporting arm according to the fourteenth embodiment of the invention.

DESCRIPTION OF THE PREFERRED EMBODIMENTS

Figure 1:
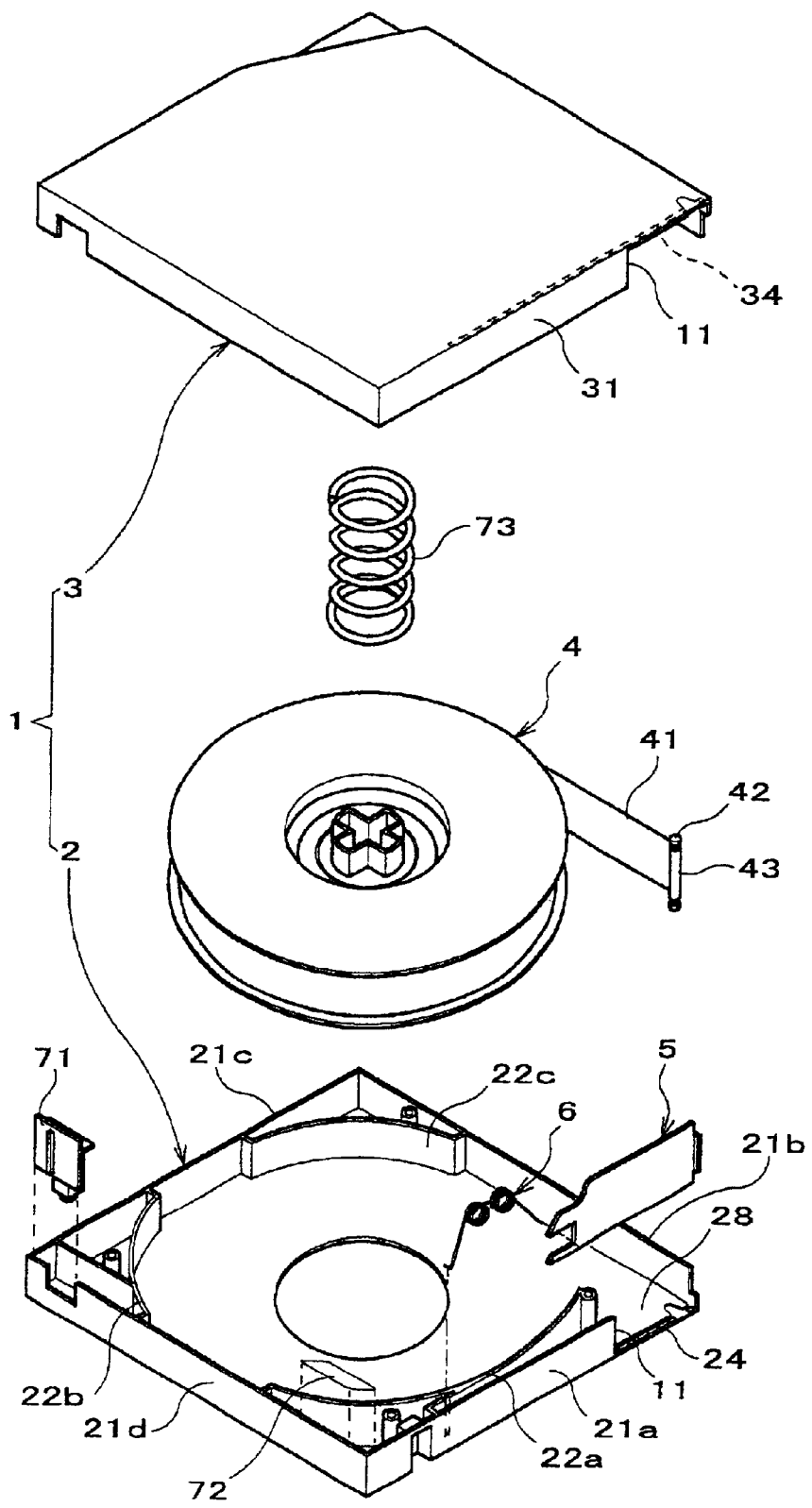
FIG. 1 is an exploded perspective view showing the magnetic tape cartridge.
Figure 2:
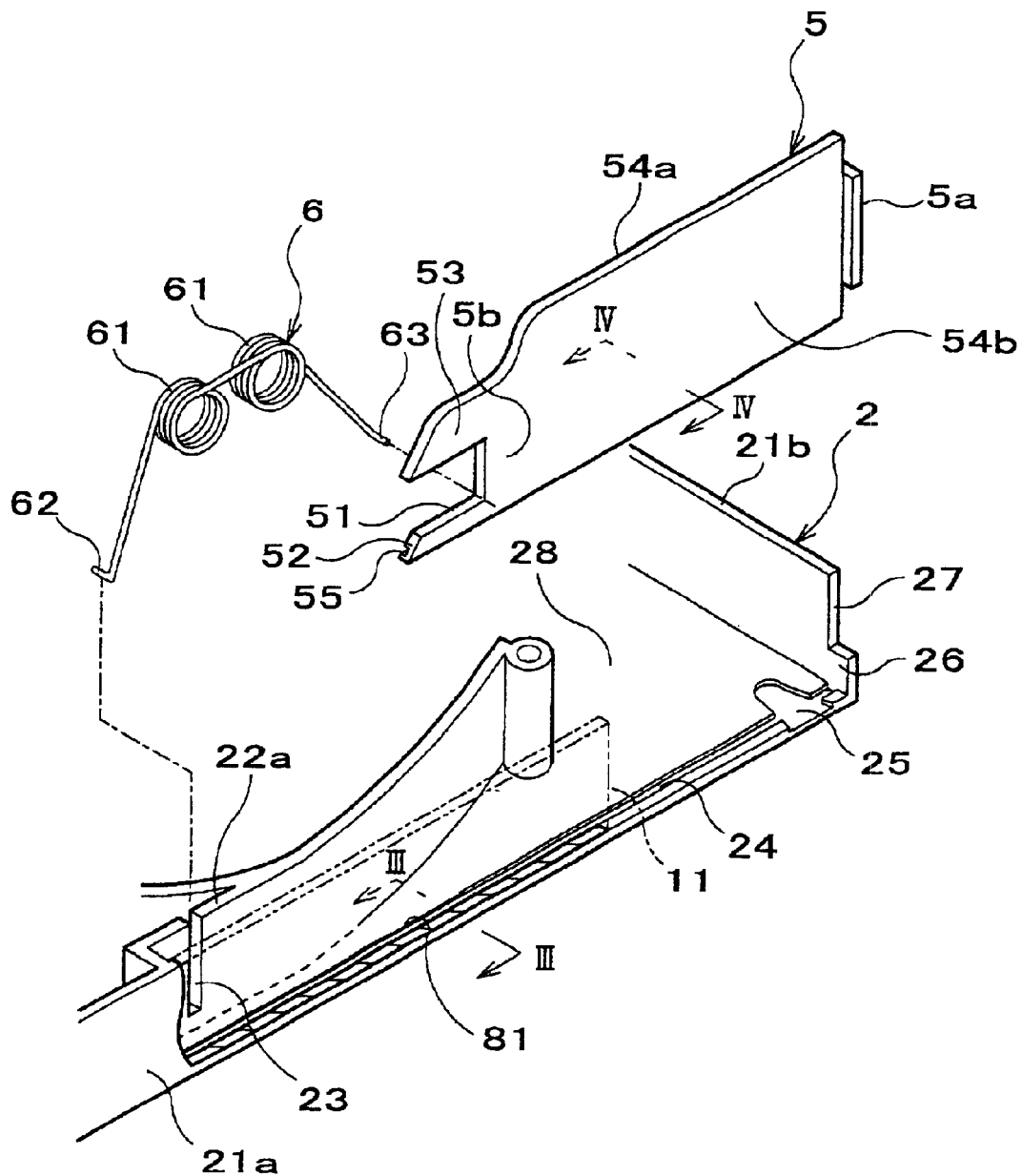
FIG. 2 is an enlarged view showing the vicinity of the sliding door shown in FIG. 1.
Figure 3A:
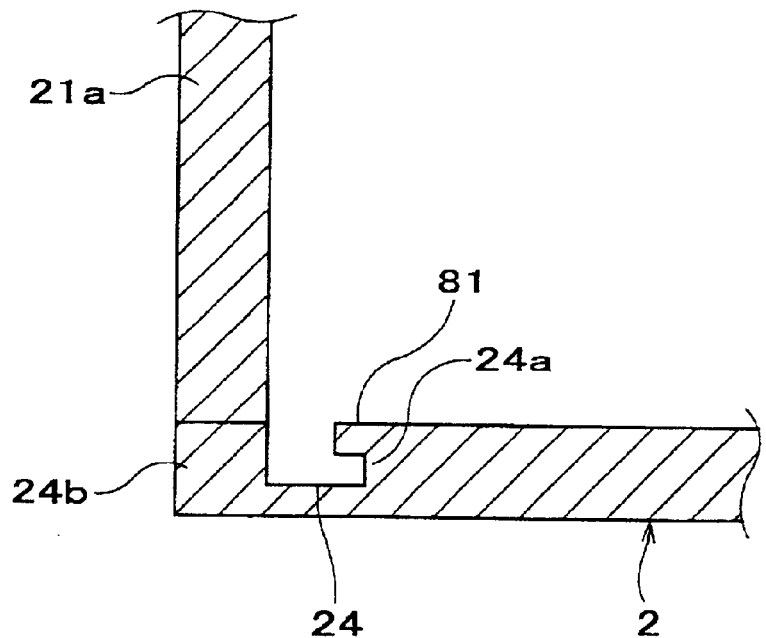
FIG. 3(a) is a section view taken along the line III—III in FIG. 2
Figure 3B:
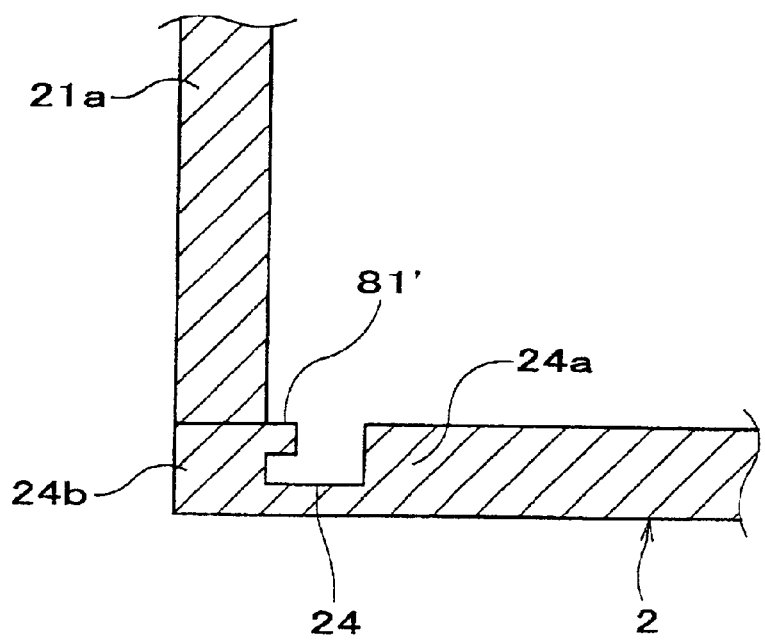
FIG. 3(b) is a section view taken along the line III—III in FIG. 2 for another rib position.
Figure 4A:
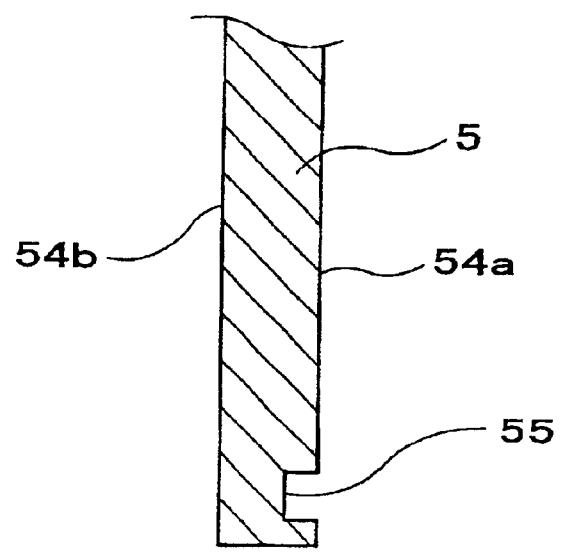
FIG. 4(a) is a section view taken along the line IV—IV in FIG. 2
Figure 4B:
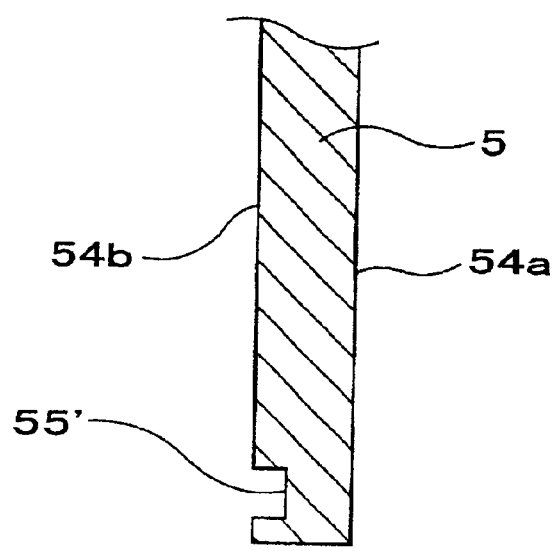
FIG. 4(b) is a section view taken along the line IV—IV in FIG. 2 for another sliding door.
Figure 5:
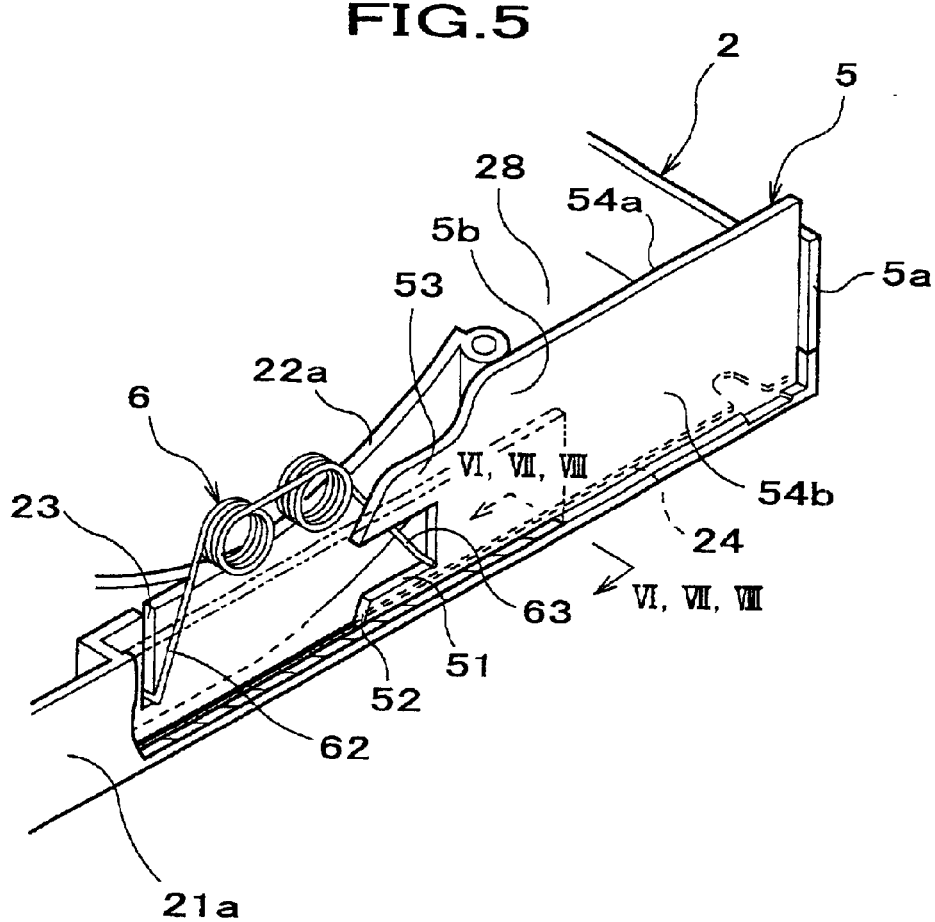
FIG. 5 is an enlarged perspective view illustrating the sliding door inserted in the lower guide channel.
Figure 6:
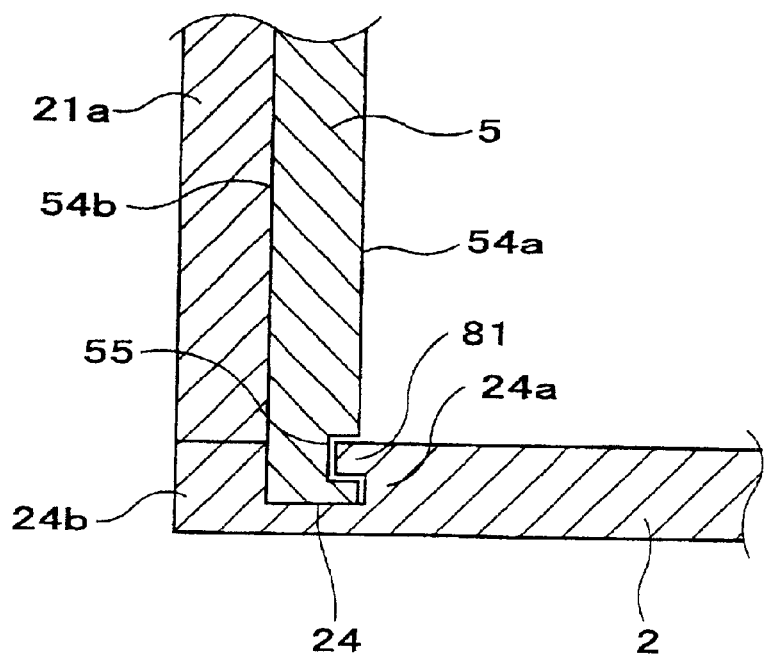
FIG. 6 is a section view taken along the line VI—VI in FIG. 5.

The embodiments of the present invention will now be described in detail referring to the accompanying drawings.
First Embodiment The referring drawings are as follows: FIG. 1 is an exploded perspective view illustrating a magnetic tape cartridge; FIG. 2 is an enlarged view illustrating the vicinity of a sliding door shown in FIG. 1; FIG. 3(a) is a section view taken along the line III—III in FIG. 2; FIG. 3(b) is a section view taken along the line III—III in FIG. 2 for another rib position. FIG. 4(a) is a section view taken along the line IV—IV in FIG. 2; FIG. 4(b) is a section view taken along the line IV—IV in FIG. 2 for another sliding door; FIG. 5 is an enlarged perspective view illustrating the sliding door inserted in the lower guide channel; FIG. 6 is a section view taken along the line VI—VI in FIG. 5.

As shown in FIG. 1 a magnetic tape cartridge includes a lower half section 2 and an upper half section 3, which form a cartridge case 1. Inside the lower half section 2 and the upper half section 3 are housed a reel 4 wound with a magnetic tape 41, a sliding door 5, a spring member 6, an inadvertent erasing protection claw 71, an IC chip 72 and a compression coil spring 73.

An opening 11, which lies across the lower half section 2 and the upper half section 3, for extracting the magnetic tape 41 is provided near the corner of a side wall 21a of the cartridge case 1. The opening 11 is opened or closed by the sliding door 5, which slides along the side wall 21a of the lower half section 2 and the side wall 31 of the upper half section 3. The spring member 6, which is a torsion coil spring with two coils, imposes the force on the sliding door 5 in the closing direction continuously.

A leader pin 42 is clamped at the leading end of the magnetic tape 41 with a clip 43. The leader pin 42 will be held by the tape loading mechanism of a record playback unit, when the record playback unit retracts the magnetic tape 41 through the opening 11.

The cartridge case 1 is formed by mating the two parts, the lower half section 2 and the upper half section 3, which include half section of the cartridge case respectively. Reinforcing ribs 22a, 22b and 22c are prepared on the base 28 of the lower half section 2 so positioned that they may not interfere with the reel 4. The space between the reinforcing ribs 22a, 22b and 22c and the side walls 21a, 21b, 21c and 21d is so arranged that the supporting and mounting of parts can be performed.

As shown in FIG. 2, a lower guide channel 24, referred to as the guide according to the appended claims, is carved on the base 28 so that the sliding door 5 can slide smoothly. The lower guide channel 24 is shallow and guides the sliding door 5 freely along with an upper guide channel 34 of the upper half section 3 to be described later (see FIG. 1). The lower guide channel 24 includes, as shown in FIG. 3(a), a first guide wall 24a located relatively inside the cartridge case and a second guide wall 24b located the opposite side, nearer the side wall 21a. A continuous rib 81 projects from the top and some rear end portion of the first guide wall 24a (left direction in FIG. 1), toward the second guide wall 24b. The rib 81 may be discontinuous instead. Also the rib 81 can be laid from the front to rear end of the lower guide channel 24 thoroughly if the sliding door 5 can be inserted into the lower guide channel 24 forcefully, when the material of the sliding door 5 or the shape of the lower guide channel 24 permits it.

The rib 81, the details of which will be described later, restricts the vertical displacement of the sliding door 5 by engaging with a groove 55 of an inner side surface 54a of the sliding door 5 (see FIG. 4(a)). In this embodiment, the rib 81 projects from the first guide wall 24a, though it can project from the second guide wall 24b shown in FIG. 3(b). In that case a rib 81' engages with a groove 55' of an outer side surface 54b of the sliding door 5 (see FIG. 4(b)).

A spring holder 23, which holds a fixing spring arm 62 of the spring member 6, is a vertical slit, which is cut on the reinforcing rib 22a that stands inside the side wall 21a across the lower guide channel 24. A holder 25, which holds the leader pin 42 (see FIG. 1) attached on the leading end of the magnetic tape 41, is provided in the corner inside the lower half section 2. When a record playback unit opens the sliding door 5, the arm of the tape loading mechanism of the record playback unit needs to press a front end 5a of the sliding door 5 (right direction in FIG. 2). Therefore, a cutout 27 for introducing the arm, about upper two thirds of the side wall 21b, is provided for the side wall 21b with which the front end 5a of the sliding door 5 interferes. And under the cutout 27 is provided a contact member 26, to which the front end 5a of the sliding door 5 contacts when the sliding door is closed.

The inner surface of the upper half section 3 (not shown) is formed approximately symmetrical with that of the lower half section 2. The upper guide channel 34, which guides the top of sliding door 5, is carved inside the opening along the side wall 31 in parallel with the opposite lower guide channel 24 (see FIG. 1).

The spring member 6 is a torsion coil spring having two coils 61. When the spring member 6 is mounted on the lower half section 2, the fixing spring arm 62 of the rear end is held by the spring holder 23 of the reinforcing rib 22a and an acting spring arm 63 is placed in the lower guide channel 24. The acting spring arm 63 placed in the lower guide channel 24, to be described in detail later, is held by a spring holder 51 provided in a rear end 5b of the sliding door 5 (left direction in FIG. 2). Though the coil spring is employed for the spring member 6 in the explanation of the embodiment, any types of springs such as a compression coil spring, extension coil spring, torsion coil spring, laminated spring, torsion bar, spiral spring, coned disk spring and flat spring may be used for the spring member 6. Their materials are not limited to metals but resins may be used instead.

The sliding door 5 is a thin rectangular plate, in the rear end 5b of which the spring holder 51 for holding the acting spring arm 63 is formed in a U-shape cutout. The lower portion of the spring holder 51 has a wedge 52 so hat the acting spring arm 63 of the spring member 6 lying in the lower guide channel 24 may be lifted and guided to the spring holder 51, when the sliding door 5 is mounted on the lower half section 2. A projection 53, which protrudes toward the rear end 5b of the sliding door 5 and the upper portion of which is cut out, is prepared for the spring holder 51 so that the coils 61 of the spring member 6 may not interfere with the sliding door 5, when the sliding door 5 is opened.

The groove 55 is carved on the inner side surface 54a of the sliding door 5 facing the rib 81 to engage with the rib 81 (see FIG. 3(a)) projecting from the top of the first guide wall 24a, as shown in FIG. 2 and FIG. 4(a). The groove 55 is laid from the front end 5a to the rear end 5b. The groove 55 engages with the rib 81 of the first guide wall 24a, and not only restricts the vertical displacement of the sliding door 5 but also guides the sliding door 5 in the lower guide channel 24 freely. When the rib 81' projects from the second guide wall 24b, located nearer the side wall 21a as shown in FIG. 3(b), the groove 55' engaging with the rib 81' will be carved on the outer side surface 54b of the sliding door 5 as shown in FIG. 4(b).

When the magnetic tape cartridge described above is assembled, the fixing spring arm 62 of the spring member 6 is held by the spring holder 23 and the acting spring arm 63 is set in the lower guide channel 24. Next, the sliding door 5 is inserted into the lower guide channel 24 tilted with the wedge 52 downward and carried to the acting spring arm 63. After the wedge 52 hits the acting spring arm 63, the wedge 52 is continued to slide in the lower guide channel 24, bending the spring member 6. When the load of the spring member 6 reaches a given value, the acting spring arm 63 is lifted by the wedge 52 and then held by the spring holder 51. When the spring member 6 is compressed till the whole sliding door 5 is ready for being inserted into the lower guide channel 24, the sliding door 5 is dropped to insert into the lower guide channel 24 (see FIG. 5).

And as shown in FIG. 5 and FIG. 6, the rib 81, which projects from the first guide wall 24a of the lower guide channel 24, and the groove 55 carved on the inner side surface 54a of the sliding door 5 are engaged. Once the rib 81 and the groove 55 are engaged, the sliding door 55 will not lift from the lower guide channel 24 even if the spring member 6 imposes the force on the sliding door 5 in the closing direction, since the sliding door 5 is restrained from displacing vertically. When the lower half section and the upper half section are mated this way, the sliding door 5 is mated properly with the lower guide channel 24 of the lower half section 2.

Second Embodiment

Figure 7:
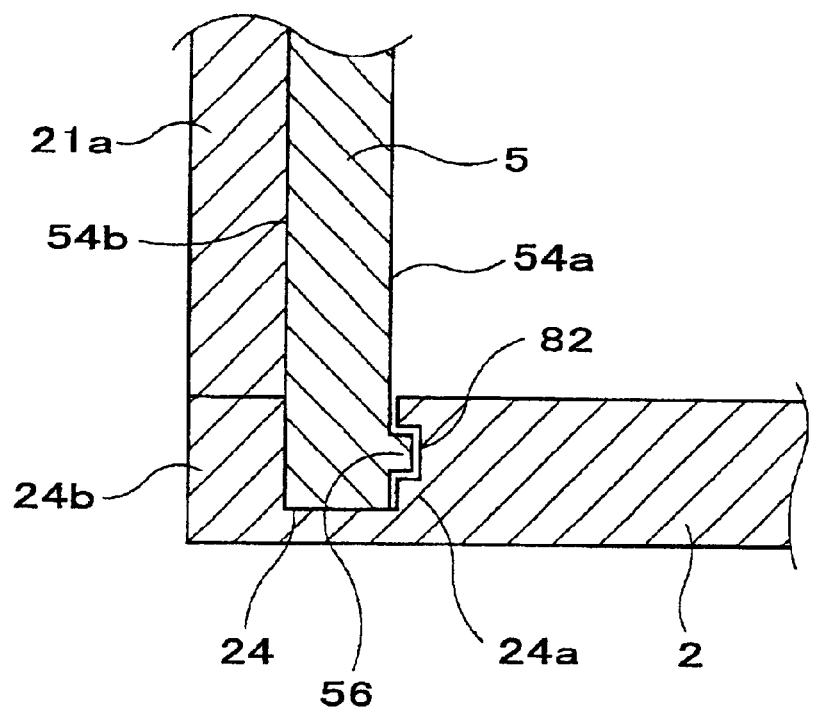
FIG. 7 is a view illustrating the section taken along the line VII—VII in FIG. 5, which shows the magnetic tape cartridge according to the second embodiment of the present invention.

Next the second embodiment of the invention will be described. In the description hereinafter, the detail explanations will be omitted for the items, which are the same as those of the first embodiment, bearing the same symbols. FIG. 7 is a view illustrating the section taken along the line VII—VII in FIG. 5, which shows the magnetic tape cartridge according to the second embodiment of the present invention.

As shown in FIG. 7 a rib 56 projects from the inner side surface 54a of the sliding door 5 against the first guide Wall 24a of the lower guide channel 24. The rib 56 is laid out from the front end Sa to the rear end 5b (see FIG. 2). A groove 82, which is to engage with the rib 56 projecting from the inner side surface 54a of the sliding door 5, is carved on the first guide wall 24a of the lower guide channel 24 facing the rib 56.

When the sliding door 5 is inserted into the lower guide channel 24, the vertical displacement of the sliding door 5 is restricted, since the rib 56 projecting from the inner side surface 54a of the sliding door 5 engages with the groove 82 carved on the first guide wall 24a of the lower guide channel 24. Thus the sliding door 5 will not lift from the lower guide channel 24 even if the spring member 6 imposes the force on the sliding door 5 in the closing direction. The groove 82 carved on the first guide wall 24a guides the sliding door 5, which is inserted into the lower guide channel 24, in the lower guide channel 24 freely. The rib 56 can project from the outer side surface 54b instead of the inner side surface 54a of the sliding door 5 (not shown). In this case the rib 56 will engage with the groove carved on the second guide wall 24b.

Third Embodiment

Figure 8:
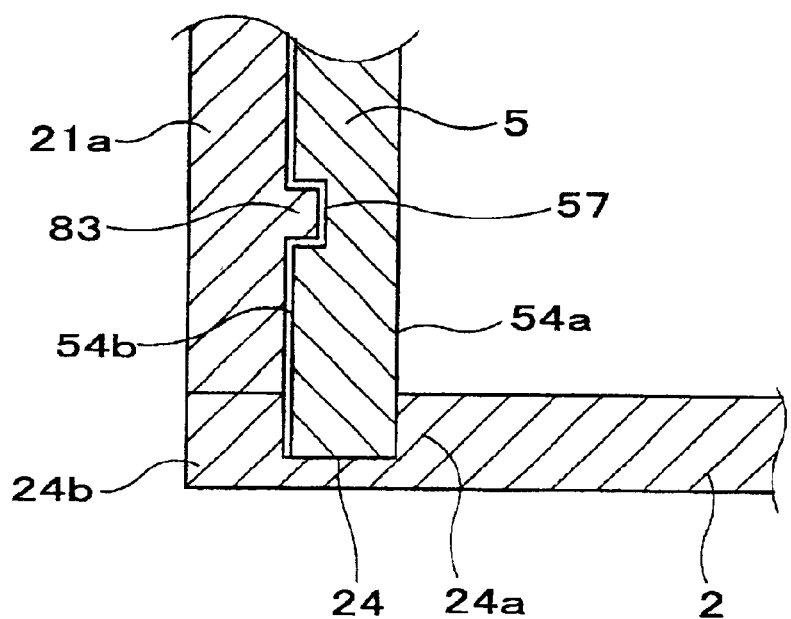
FIG. 8 is a view illustrating the section taken along the line VIII—VIII in FIG. 5, which shows the magnetic tape cartridge according to the third embodiment of the present invention.

Next the third embodiment of the invention will be described. In the description hereinafter, the detail explanations will be omitted for the items, which are the same as those of the first or second embodiment, bearing the same symbols. FIG. 8 is a view illustrating the section taken along the line VIII—VIII in FIG. 5, which shows the magnetic tape cartridge according to the third embodiment of the present invention.

As shown in FIG. 8, a rib 83 projects from the inner surface of the side wall 21a of the lower half section 2. A groove 57, which is to engage with the rib 83, is carved on the outer side surface 54b of the sliding door 5 facing the rib 83. The groove 57 is laid out from the front end 5a to the rear end 5b of the sliding door 5 (see FIG. 2).

When the sliding door 5 is inserted into the lower guide channel 24, the vertical displacement of the sliding door 5 is restricted, since the rib 83 projecting from the inner surface of the side wall 21a engages with the groove 57 carved on the outer side surface 54b of the sliding door 5. Thus the sliding door 5 will not lift from the lower guide channel 24 even if the spring member 6 imposes the force on the sliding door 5 in the closing direction. The groove 57 carved on the outer side surface 54b of the sliding door 5 guides the sliding door 5, which is inserted into the lower guide channel 24, in the lower guide channel 24 freely. The rib 83 can project from the outer side surface 54b of the sliding door 5 instead of the inner surface of the side wall 21a (not shown). In this case the rib 83 will engage with the groove carved on the inner surface of the side wall 21a.

Fourth Embodiment

Figure 9:
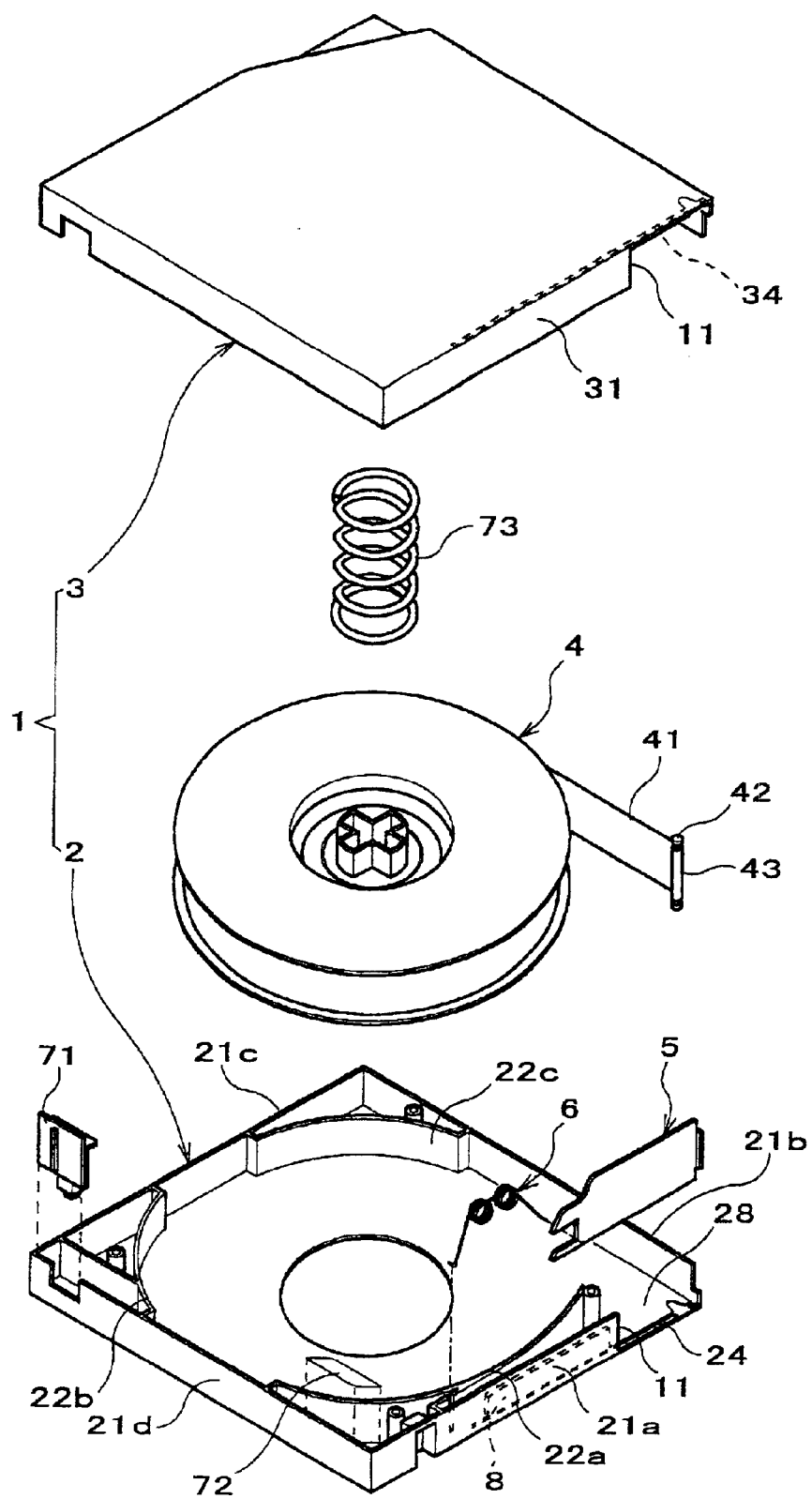
FIG. 9 is an exploded perspective view of the magnetic tape cartridge according to the fourth embodiment.
Figure 10:
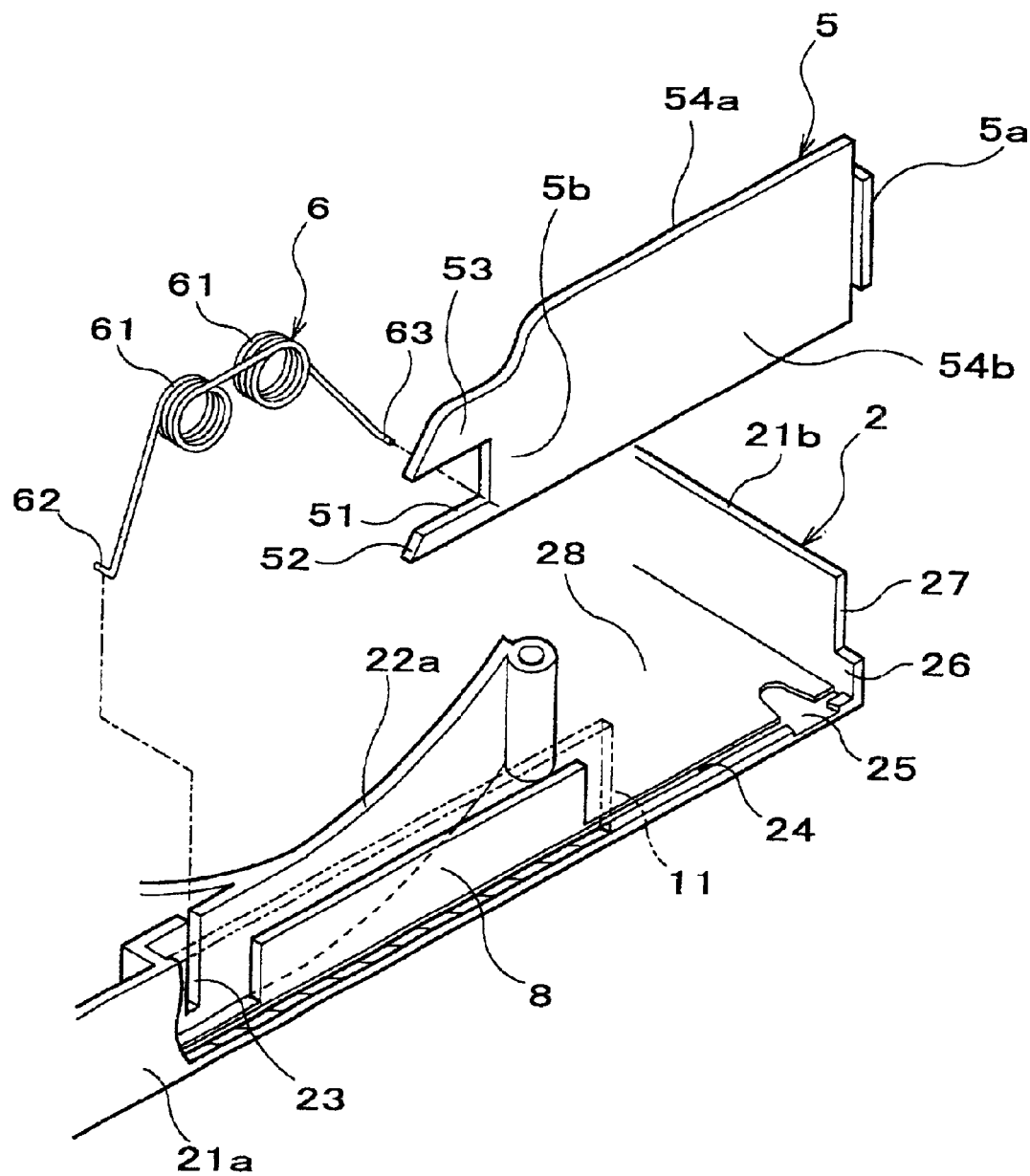
FIG. 10 is an enlarged view illustrating the vicinity of the sliding door shown in FIG. 9.
Figure 11:
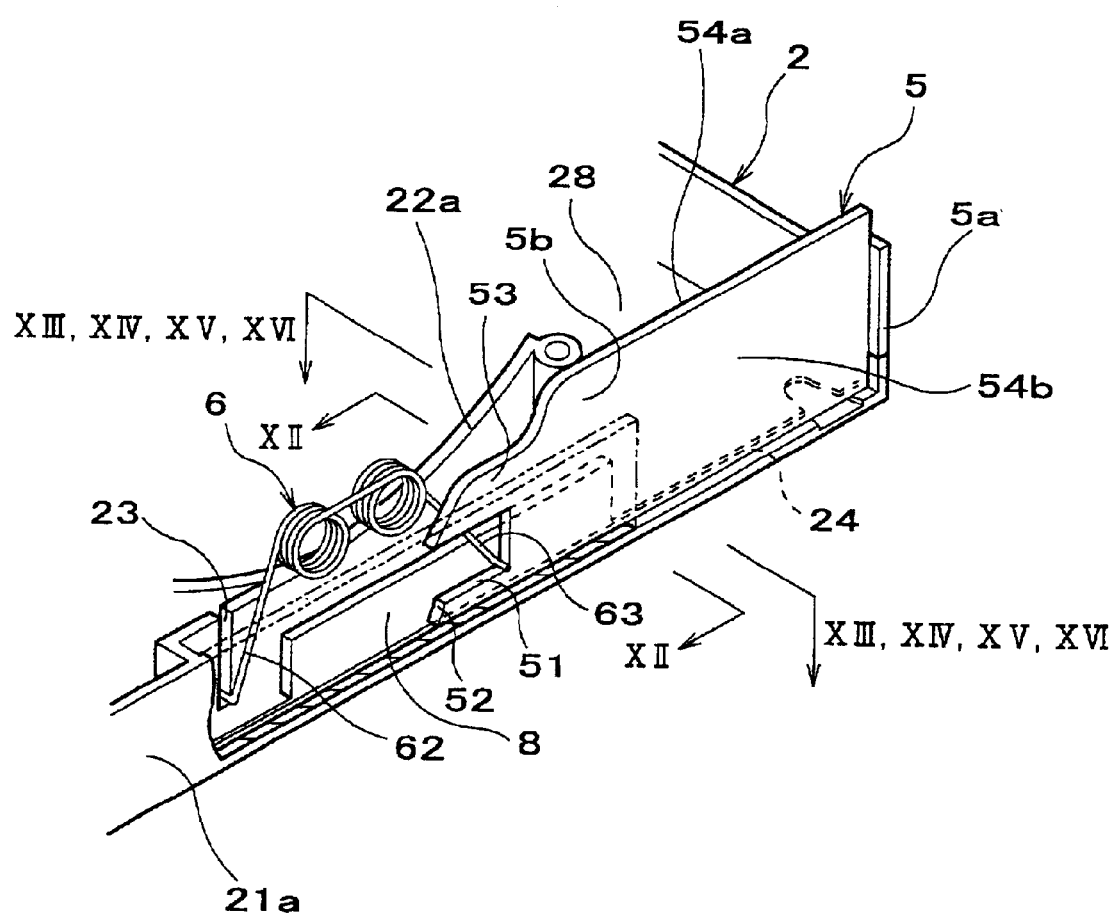
FIG. 11 is another enlarged view showing the vicinity of the sliding door, which is inserted in the lower guide channel.
Figure 12:
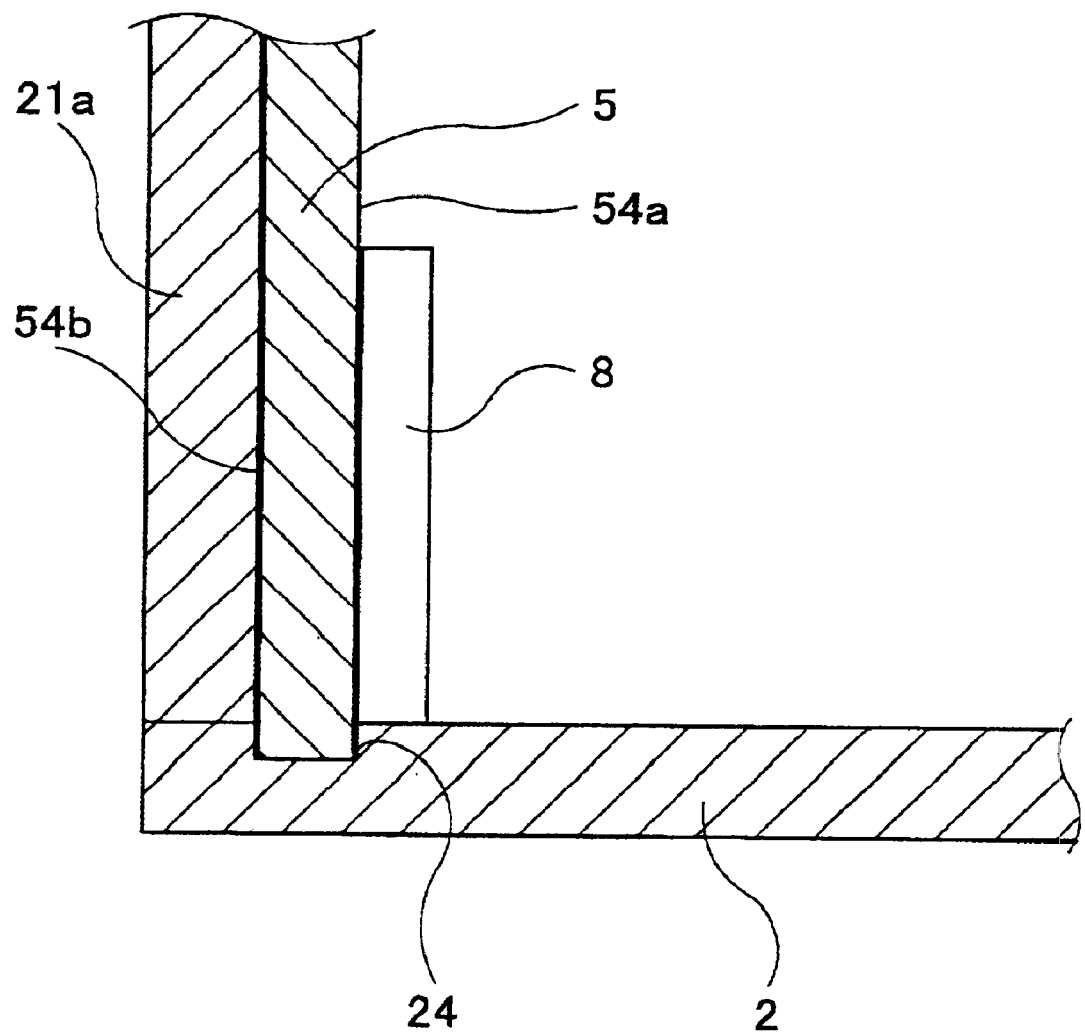
FIG. 12 is a section view taken along the line XII—XII in FIG. 11.
Figure 13:
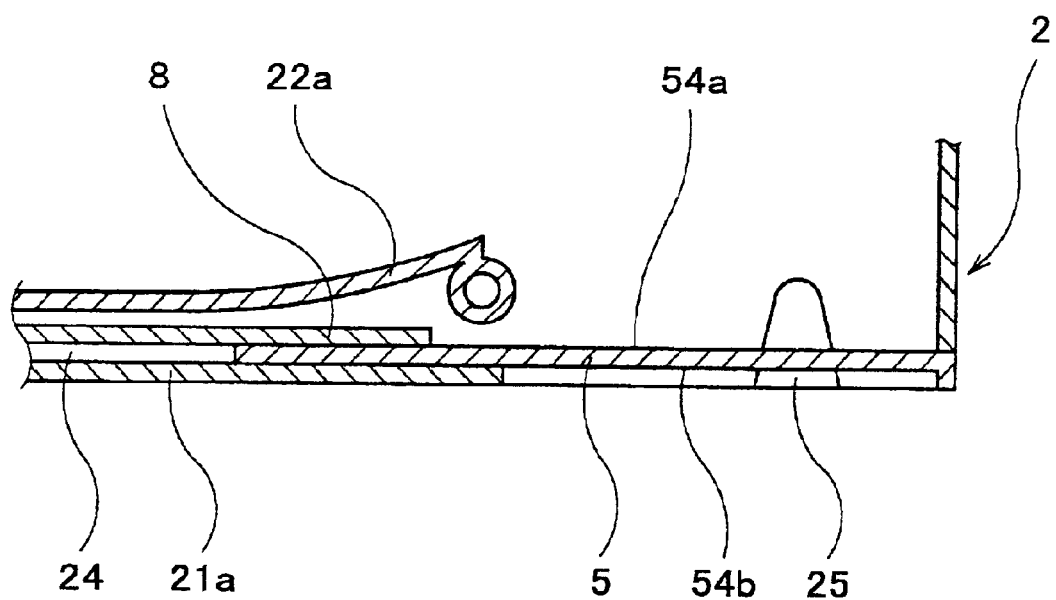
FIG. 13 is a section view taken along the line XIII—XIII in FIG. 11.

Next the fourth embodiment of the invention will be described. FIG. 9 is an exploded perspective view of the magnetic tape cartridge, and FIG. 10 is an enlarged view illustrating the vicinity of the sliding door shown in FIG. 9. FIG. 11 is another enlarged view showing the vicinity of the sliding door, which is inserted in the lower guide channel. FIG. 12 is a section view taken along the line XII—XII in FIG. 11. FIG. 13 is a section view taken along the line XIII—XIII in FIG. 11.

As shown in FIG. 9, the magnetic tape cartridge according to the fourth embodiment is so arranged that the reel 4 wound by the magnetic tape 41, the sliding door, the spring member 6, the inadvertent erasing protection claw 71, the IC chip 72 and the compression coil spring 73 are housed in the lower half section 2 and the upper half section 3, which form the cartridge case 1.

The opening 11, which lies across the lower half section 2 and the upper half section 3, for extracting the magnetic tape 41 is provided near the corner of the side wall 21a of the cartridge case 1. The opening 11 is opened or closed by the sliding door 5, which slides along the side wall 21a of the lower half section 2 and the side wall 31 of the upper half section 3. The spring member 6, which is a torsion coil spring with two coils, imposes the force on the sliding door 5 in the closing direction continuously.

The leader pin 42 is clamped at the leading end of the magnetic tape 41 with the clip 43. The leader pin 42 will be held by the tape loading mechanism of a record playback unit, when the record playback unit retracts the magnetic tape 41 through the opening 11.

The cartridge case 1 is formed by mating the two parts, the lower half section 2 and the upper half section 3, which include half section of the cartridge case respectively. Reinforcing ribs 22a, 22b and 22c are provided on the base 28 of the lower half section 2. The space between the reinforcing ribs 22a, 22b and 22c and the side walls 21a, 21b, 21c and 21d is so arranged that the supporting and mounting of parts can be performed.

As shown in FIG. 10, the lower guide channel 24, referred to as the guide according to the appended claim, is carved on the base 28 so that the sliding door 5 can slide smoothly. The lower guide channel 24 is shallow and guides the sliding door 5 freely along with the upper guide channel 34 of the upper half section 3 to be described later (see FIG. 9).

A restricting rib 8 stands along the lower guide channel 24 on the base 28 in a given height, which refers to the restriction device according to the appended claims. The restricting rib 8 is placed facing the side wall 21a of the lower half section 2, between which the lower guide channel 24 lies, to restrain the sliding door 5 from falling in the direction normal to its plane along with the side wall 21a, when the sliding door 5 is inserted into the lower guide channel 24. The height of the restricting rib 8 is so arranged that it may support to prevent the sliding door 5 from falling.

The spring holder 23, which holds the fixing spring arm 62 of the rear end of the spring member 6, is a vertical slit, which is cut on the reinforcing rib 22a that stands inside the side wall 21a across the lower guide channel 24. The holder 25, which holds the leader pin 42 (see FIG. 1) attached on the leading end of the magnetic tape 41, is provided in the corner inside the lower half section 2. When a record playback unit opens the sliding door 5, the arm of the tape loading mechanism of the record playback unit needs to press the front end 5a of the sliding door 5 (right direction in FIG. 10). The cutout 27 for introducing the arm, about upper two thirds of the side wall 21b, is provided for the side wall 21b with which the front end 5a of the sliding door 5 interferes. And under the cutout 27 is provided the contact member 26, to which the front end 5a of the sliding door 5 contacts when the sliding door is closed.

The inner surface of the upper half section 3 (not shown) is formed approximately symmetrical with that of the lower half section 2. The upper guide channel 34, which guides the top of sliding door 5, is carved inside the opening along the side wall 31 in parallel with the opposite lower guide channel 24 (see FIG. 9). The spring member 6 is a torsion coil spring having two coils 61. When the spring member 6 is mounted on the lower half section 2, the fixing spring arm 62 of the rear end is held by the spring holder 23 of the reinforcing rib 22a and the acting spring arm 63 is placed in the lower guide channel 24. The acting spring arm 63 placed in the lower guide channel 24, to be described in detail later, is held by the spring holder 51 provided in the rear end 5*b* of the sliding door 5 (left direction in FIG. 10). Though the coil spring has been used for the spring member 6 in the explanation of the embodiment, any types of springs such as a compression coil spring, extension coil spring, torsion coil spring, laminated spring, torsion bar, spiral spring, coned disk spring and flat spring may be employed. Their materials are not limited to metals but resins may be used instead.

The sliding door 5 is a thin rectangular plate, in the rear end 5*b* of which the spring holder 51 for holding the acting spring arm 63 is formed in a U-shape cutout. The lower portion of the spring holder 51 has the wedge 52 so that the acting spring arm 63 of the spring member 6 lying in the lower guide channel 24 may be lifted and guided to the spring holder 51, when the sliding door 5 is mounted on the lower half section 2. The projection 53, which protrudes toward the rear end 5*b* of the sliding door 5 and the upper portion of which is cut out, is prepared for the spring holder 51 so that the coils 61 of the spring member 6 may not interfere with the sliding door 5, when the sliding door 5 is opened.

When the magnetic tape cartridge described above is assembled, the fixing spring arm 62 of the spring member 6 is held by the spring holder 23 and the acting spring arm 63 is set in the lower guide channel 24. Next, the sliding door 5 is inserted into the lower guide channel 24 tilted with the wedge 52 downward and the sliding door 5 is carried to the acting spring arm 63. After the wedge 52 hits the acting spring arm 63, the wedge 52 is continued to slide in the lower guide channel 24, bending the spring member 6. Then when the load of the spring member 6 reaches a given value, the acting spring arm 63 is lifted by the wedge 52 and held by the spring holder 51. When the spring member 6 is compressed till the whole sliding door 5 is ready for being inserted into the lower guide channel 24, the sliding door 5 is dropped to insert into the lower guide channel 24 (see FIG. 11).

The restricting rib 8 prevents the sliding door 5 inserted in the lower guide channel 24 from falling inward of the sliding door 5 (right direction in FIG. 12, upper direction in FIG. 13), in contact with the inner side surface 54*a* of the sliding door 5 shown in FIG. 12 and FIG. 13. Also, the sliding door 5 will not fall outward of the sliding door 5 (left direction in FIG. 12 or lower direction in FIG. 13), since the outer side surface 54*b* of the sliding door 5 is in contact with the side wall 21*a* of the lower half section 2. Thus the sliding door 5 is prevented from falling in the direction normal to its plane by the restricting rib 8 and the side wall 21*a*, thereby inserted into the lower guide channel 24 of the lower half section 2 properly. Therefore, if the lower half section and the upper half section are mated under the conditions described above, it will be performed easily.

Fifth Embodiment

Figure 14:
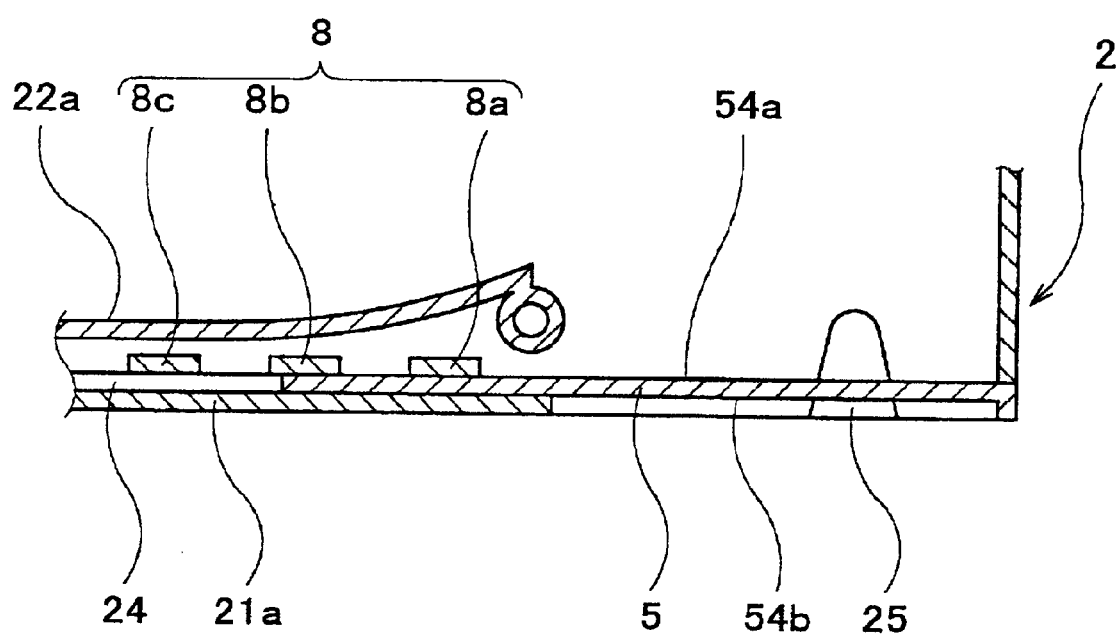
FIG. 14 is a view illustrating the section taken along the line XIV—XIV in FIG. 11 showing the fifth embodiment.

Next the fifth embodiment of the invention will be described. In the description hereinafter, the detail explanations will be omitted for the items, which are the same as those of the fourth embodiment, bearing the same symbols. FIG. 14 is a view illustrating the section taken along the line XIV—XIV in FIG. 11 showing the fifth embodiment.

As shown in FIG. 14, the restricting rib 8 according to fifth embodiment of the invention is divided into a plurality of restricting ribs 8*a*, 8*b* and 8*c*. The restricting ribs 8*a*, 8*b* and 8*c* prevent the sliding door 5, which is inserted in the lower guide channel 24, from falling inward (upper direction in FIG. 14) by keeping in contact with the inner side surface 54*a* of the sliding door 5. The number of division of the restricting rib 8 and the spacing of individual restricting ribs may be arranged as required.

Sixth Embodiment

Figure 15:
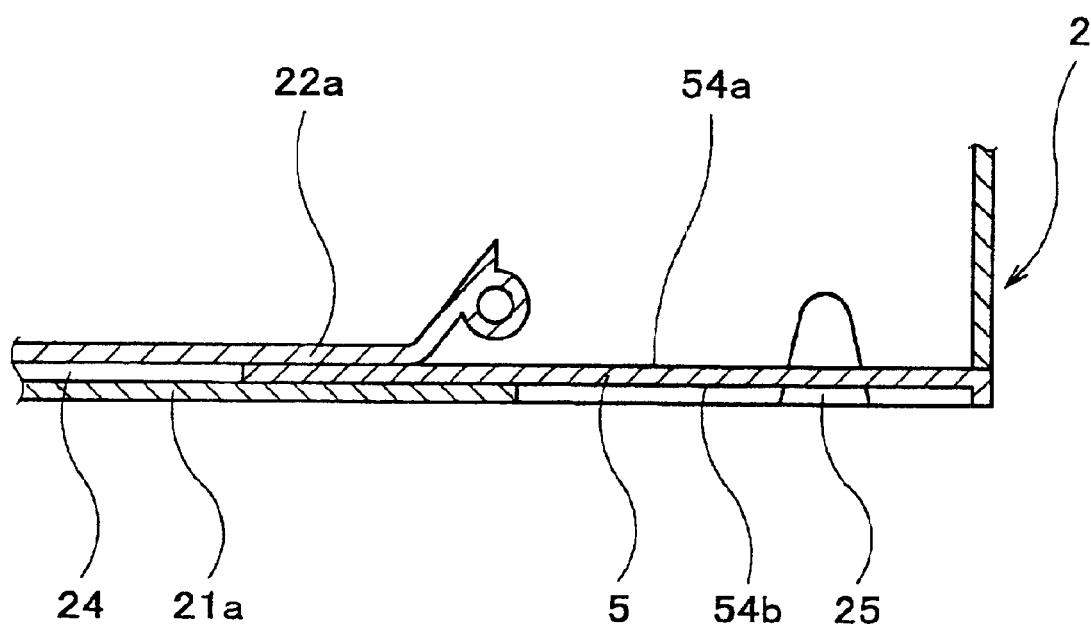
FIG. 15 is a view illustrating the section taken along the line XV—XV in FIG. 11 showing the sixth embodiment.

Next the sixth embodiment of the invention will be described. In the description hereinafter, the detail explanations will be omitted for the items, which are the same as those of the fourth embodiment, bearing the same symbols. FIG. 15 is a view illustrating the section taken along the line XV—XV in FIG. 11 showing the sixth embodiment.

As shown in FIG. 15, the reinforcing rib 22*a* according to the sixth embodiment of the invention stands along the lower guide channel 24. The restriction device according to appended claims can be attained by standing the reinforcing rib 22*a* along the lower guide channel 24. The reinforcing rib 22*a* prevents the sliding door 5 from falling inward of the sliding door 5 (upper direction in FIG. 15), by keeping in contact with the inner side surface 54*a* of the sliding door 5, which is inserted in the lower guide channel 24.

Seventh Embodiment

Figure 16:
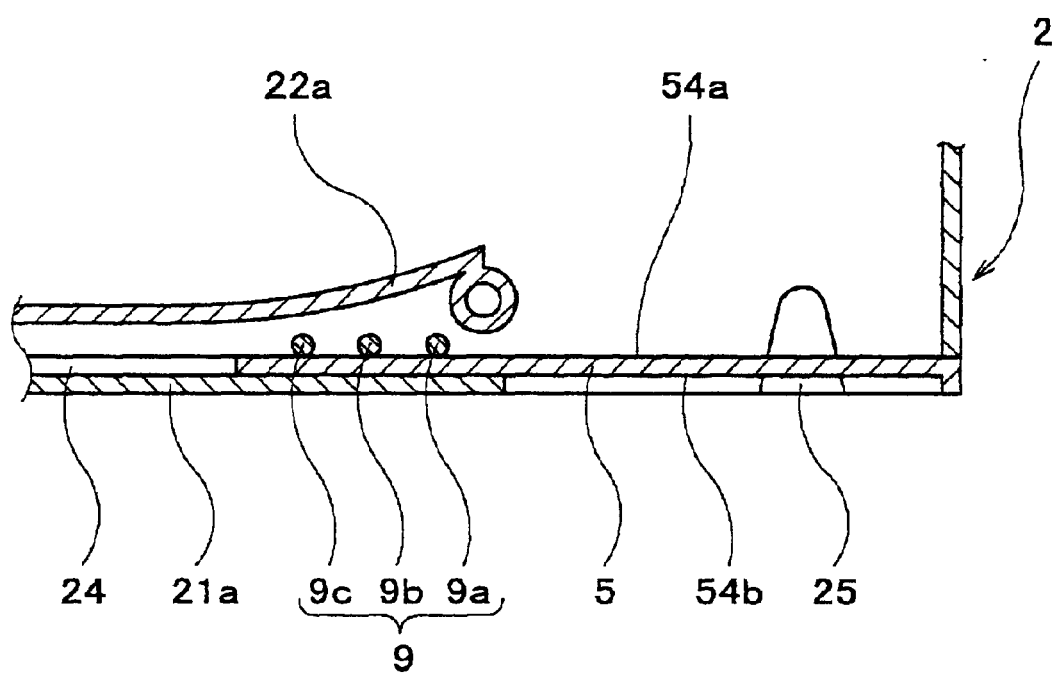
FIG. 16 is a view illustrating the section taken along the line XVI—XVI in FIG. 11 showing the seventh embodiment.

Next the seventh embodiment of the invention will be described. In the description hereinafter, the detail explanations will be omitted for the items, which are the same as those of the fourth embodiment, bearing the same symbols. FIG. 16 is a view illustrating the section taken along the line XVI—XVI in FIG. 11 showing the seventh embodiment.

As shown in FIG. 16, pins 9*a*, 9*b* and 9*c* according to the seventh embodiment of the invention stand along the lower guide channel 24. The restriction device according to appended claims can be attained by standing the pins 9*a*, 9*b* and 9*c* along the lower guide channel 24. The pins 9*a*, 9*b* and 9*c* prevent the sliding door 5 from falling inward of the sliding door 5 (upper direction in FIG. 16), by keeping in contact with the inner side surface 54*a* of the sliding door 5, which is inserted in the lower guide channel 24. The number of pins 9 and the spacing of individual pins may be arranged as required.

Eighth Embodiment

Figure 17:
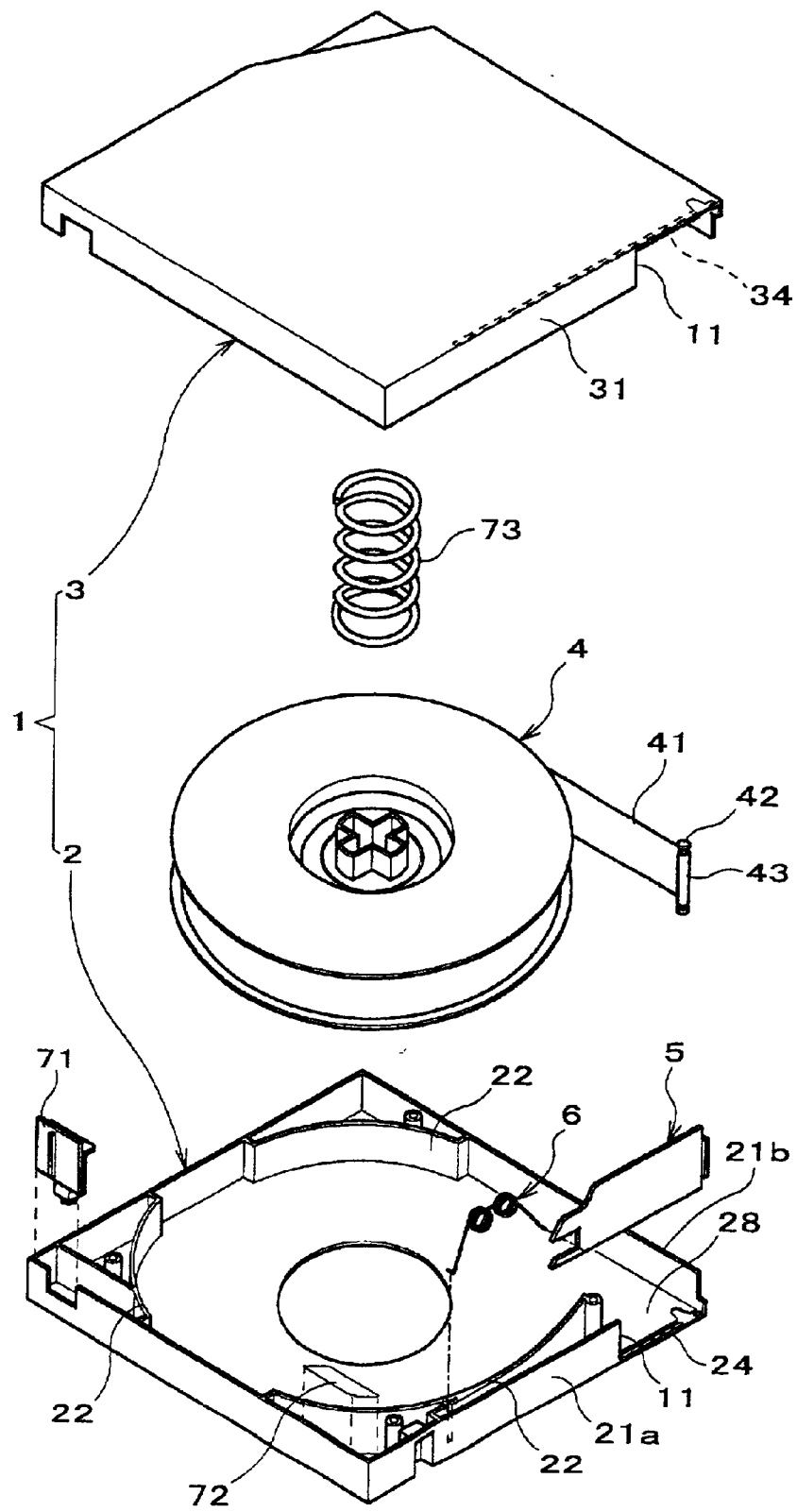
FIG. 17 is an exploded perspective view of the magnetic tape cartridge according to the eighth embodiment.
Figure 18:
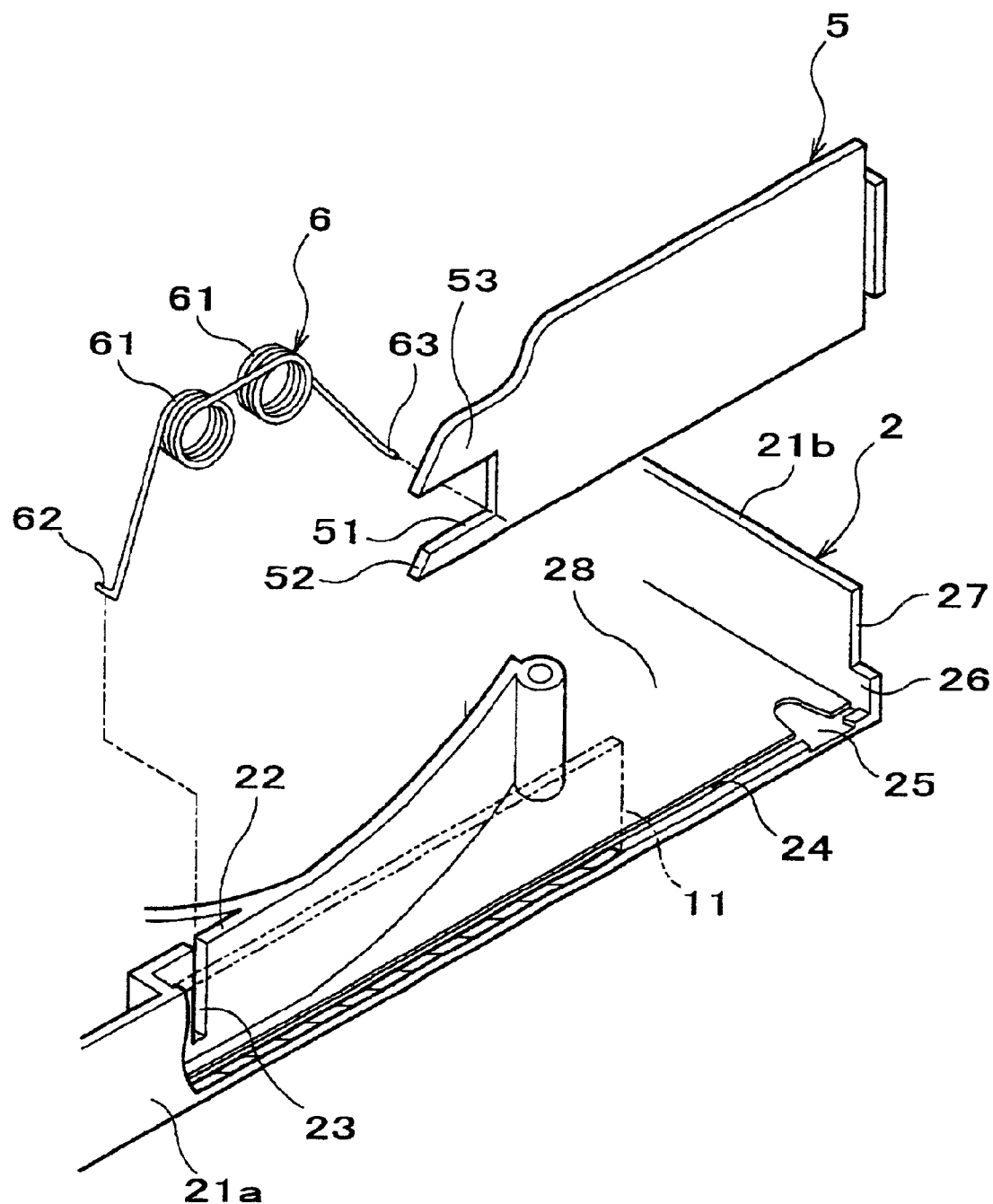
FIG. 18 is an enlarged view showing the vicinity of the sliding door in FIG. 8.

The eighth embodiment of the present invention will be described with the reference to the accompanying drawings. FIG. 17 is an exploded perspective view of the magnetic tape cartridge and FIG. 18 is an enlarged view showing the vicinity of the sliding door.

As shown in FIG. 17, the magnetic tape cartridge according to the eighth embodiment is so arranged that the reel 4 wound by the magnetic tape 41, the sliding door 5, the spring member 6, the inadvertent erasing protection claw 71, the IC chip 72 and the compression coil spring 73 are housed in the lower half section 2 and the upper half section 3, which form the cartridge case 1.

The opening 11, which lies across the lower half section 2 and the upper half section 3, for extracting the magnetic tape 41 is provided near the corner of the side wall 21*a* of the cartridge case 1. The opening 11 is opened or closed by the sliding door 5, which slides along the side wall 21*a* of the lower half section 2 and the side wall 31 of the upper half section 3. The sliding door 5 is continuously pressed in the closing direction by the spring member 6, which is a torsion coil spring with two coils.

The leader pin 42 is clamped at the leading end of the magnetic tape 41 with the clip 43. The leader pin 42 will be held by the tape loading mechanism of a record playback unit, when the record playback unit retracts the magnetic tape 41.

The cartridge case 1 is formed by mating the two parts, the lower half section 2 and the upper half section 3, which include half section of the cartridge case respectively. Reinforcing ribs 22 are positioned so that they may not interfere with the reel 4 on the base of the lower half section 2. The cartridge case is so arranged that the supporting and mounting of parts can be performed with the reinforcing ribs 22.

As shown in FIG. 18, the lower guide channel 24, referred to as the guide according to the appended claims, is carved on the base 28 so that the sliding door 5 can slide smoothly. The lower guide channel 24 is shallow and guides the sliding door 5 freely along with the upper guide channel 34 of the upper half section 3 to be described later (see FIG. 17). The spring holder 23, which holds the fixing spring arm 62 of the rear end of the spring member 6, is a vertical slit, which is cut on one of the reinforcing ribs 22 that stands inside the side wall 21a across the lower guide channel 24. The holder 25, which holds the leader pin 42 when it is in the cartridge case, is provided in the corner inside the lower half section 2. The cutout 27 for introducing the arm, about upper two thirds of the side wall 21b, is provided for the side wall 21b with which the front end of the sliding door 5 (right direction in FIG. 18) interferes, since the arm of a record playback unit needs to press the front end of the sliding door 5 when the record playback unit opens the sliding door 5. The contact member 26, with which the front end of the sliding door is in contact when it is closed, is elevated from the base 28 of the lower half section 2.

The inner surface of the upper half section 3 (not shown) is formed approximately symmetrical with that of the lower half section 2. The upper guide channel 34, which guides the top of sliding door 5, is carved inside the opening along the side wall 31 in parallel with the opposite lower guide channel 24 (see FIG. 17).

The spring member 6 is a torsion coil spring having two coils 61. When the spring member 6 is mounted on the lower half section 2, the fixing spring arm 62 of the rear end is held by the spring holder 23 and the acting spring arm 63 of the front end is placed in the lower guide channel 24. Subsequently, the sliding door 5 is inserted into the lower guide channel 24, while the acting spring arm 63 is bent by the rear end of the sliding door 5 (left direction in FIG. 18) The sliding door 5 is a thin rectangular plate, in the rear end of which the spring holder 51 for holding the acting spring arm 63 is formed in a U-shape cutout. The lower portion of the spring holder 51 has the wedge 52 so that the acting spring arm 63 of the spring member 6 may be lifted, when the sliding door 5 is mounted on the lower half section 2 by bending the spring member 6. The projection 53 is prepared, which protrudes toward the rear end of the sliding door 5 and the upper portion of which is cut out so that the coils 61 of the spring member 6 may not interfere with the sliding door 5 when it is opened. The top of the projection 53 is slightly higher than the side wall 21a, thereby exceeding the height of the side wall 21a, when the sliding door 5 is inserted into the lower guide channel 24.

The process of assembling the magnetic tape cartridge described above will next be explained. Any type of assembly can be applied to the magnetic tape cartridge such as the assembly by a man, the assembly with dedicated assembly equipment, or the assembly with an all-purpose robot.

Figure 19A:
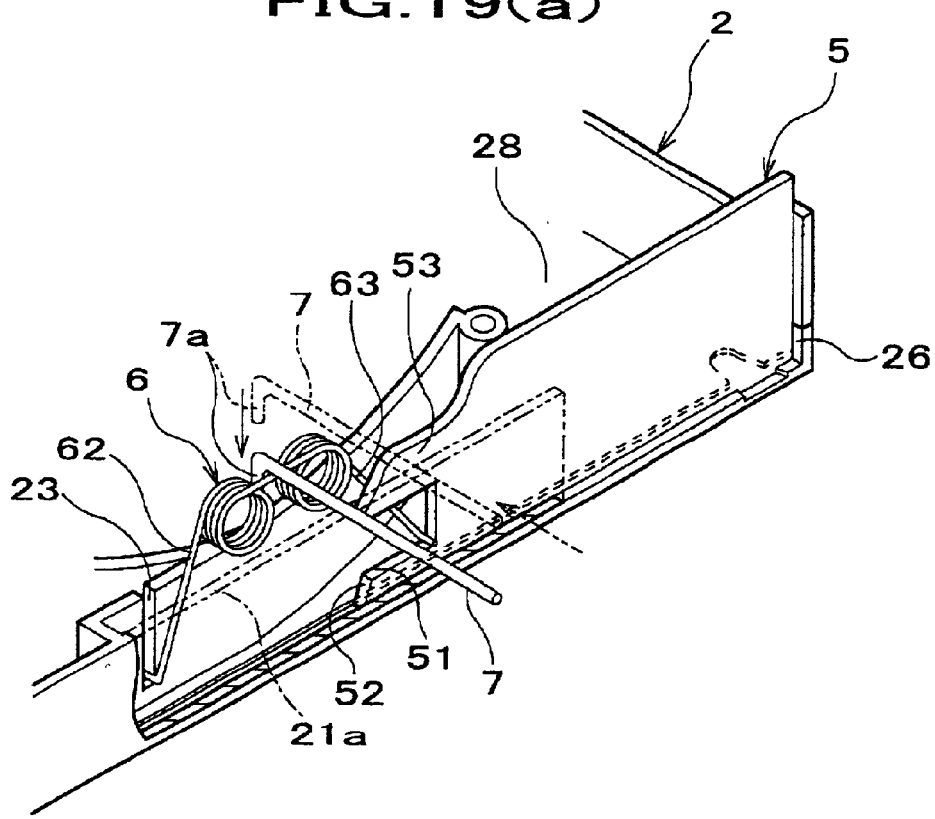
FIG. 19(a) and FIG. 19(b) are for explaining the assembly process of the magnetic tape cartridge according to the eighth embodiment.
Figure 19B:
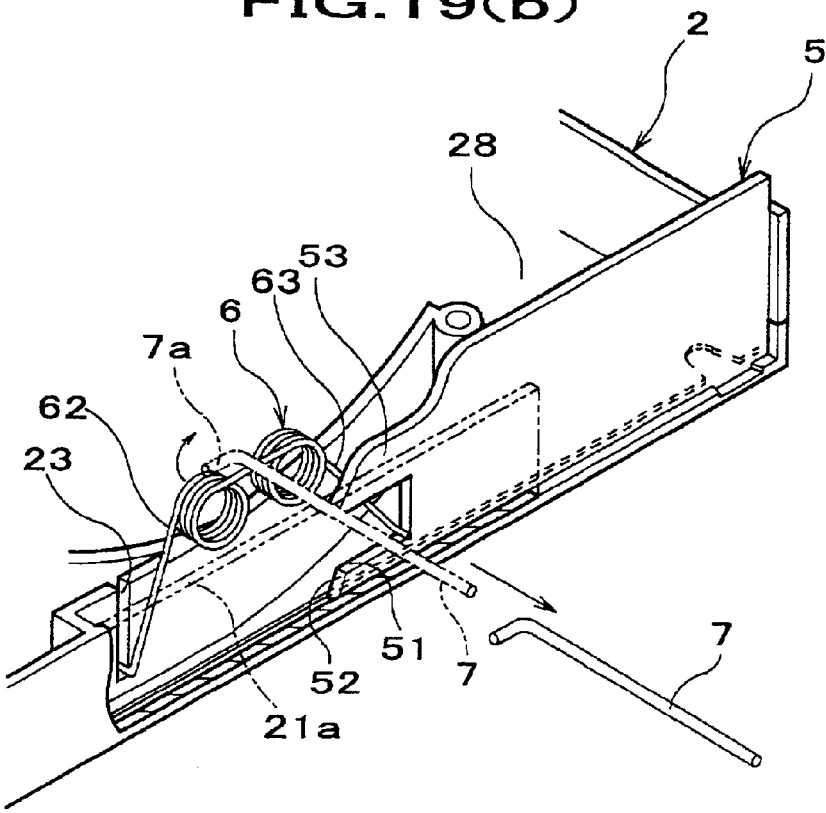

FIG. 19(a) and FIG. 19(b) are for explaining the assembly process of the magnetic tape cartridge shown in FIG. 17. When the magnetic tape cartridge described above is assembled, the fixing spring arm 62 of the spring member 6 is held by the spring holder 23 and the acting spring arm 63 is set in the lower guide channel 24. Next, the sliding door 5 is inserted inside the side wall 21a tilted with the wedge 52 downward, and the sliding door 5 is carried to the acting spring arm 63 sliding the wedge 52 in the lower guide channel 24. After the wedge 52 hits the acting spring arm 63, the wedge 52 is continued to slide in the lower guide channel 24, bending the spring member 6. Then when the load of the spring member 6 reaches a given value, the acting spring arm 63 is lifted by the wedge 52 and held by the spring holder 51. When the spring member 6 is compressed till the whole sliding door 5 is ready for being inserted into the lower guide channel 24, the sliding door 5 is dropped to insert into the lower guide channel 24. The sliding door 5 will stand still if no external force acts, since the sliding door 5 is pressed to the contact member 26 by the force imposed by the spring member 6. However, the sliding door 5 may possibly be lifted and off the lower guide channel 24 by small force such as vibration, since the spring member 6 and the sliding door 5 are unstable due to the fact that the force acting on the sliding door 5 by the spring member 6 is supported only by the small contact member 26 standing on the base 28 of the lower half section 2. Also the sliding door 5 is liable to fall inward the lower half section 2, for the sliding door 5 is supported only by the side wall 21a and the shallow lower guide channel 24 in the direction normal to its plane (thickness direction).

So as shown in FIG. 19 for example, an L-shape stick 7, which is an assembly support device having a right-angle bent end, a holding point 7a, is introduced to press the spring member 6 toward the base 28. The L-shape stick 7 is brought from the outside of the lower half section 2 over the spring member 6 with the holding point 7a downward (see the two-dot chain line in FIG. 19(a)), and dropped to press the spring member 6 toward the base 28 of is the lower half section 2 (see the solid line in FIG. 19(a)). Thus the spring member 6 is prevented from lifting. Further, since the acting spring arm 63 is held on the spring holder 51, the spring member 6 imposes the force on the sliding door 5, thereby preventing the sliding door 5 from lifting. It would be preferable to draw the spring member 6 to the side wall 21a with the L-shape stick 7 in parallel with pressing the spring member 6 toward the base 28. This will allow standing the spring member 6 normal to the base 28, since the spring member 6 is pressed to the side wall 21a. When the spring member 6 is pressed to the side wall 21a, the sliding door 5 is pressed to the side wall 21a by the acting spring arm 63, since the sliding door 5 is interposed between the acting spring arm 63 and the side wall 21a. Therefore, the sliding door 5 can also stand normal to the base 28.

The lifting and falling of the sliding door 5 and the spring member 6 will be prevented under the conditions that the spring member 6 is pressed as described above, when the upper half section 3 is mated with the lower half section 2. Therefore, the sliding door 5 is not off the lower guide channel 24, thus enabling the sliding door 5 to be inserted into the upper guide channel 34 easily (see FIG. 17), which is carved on the upper half section 3.

Pressing of the spring member 6 by the L-shape stick 7 should be released just before the completion of mating the upper half section 3 with the lower half section 2, since the L-shape stick 7 will be an obstacle for finalizing the mating. As shown in FIG. 19(b), in which the upper half section is omitted, when the upper half section 3 has been mated just over the L-shape stick 7, the L-shape stick 7 is turned 90 deg clockwise in FIG. 19(b) (see the two-dot chain line) and pulled out of the lower half section 2 (see the solid line). Subsequently, the upper half section 3 is mated with the lower half section 2 completely. Thus the mating of the lower half section 2 and the upper half section 3 can be performed easily.

Next, the application of the method for assembling the magnetic tape cartridge according to the present invention to another type of magnetic tape cartridges will be described. In the following the detailed description would be omitted for the items which are the same as those according to the eighth embodiment, bearing the same symbols.

Ninth Embodiment

Figure 20:
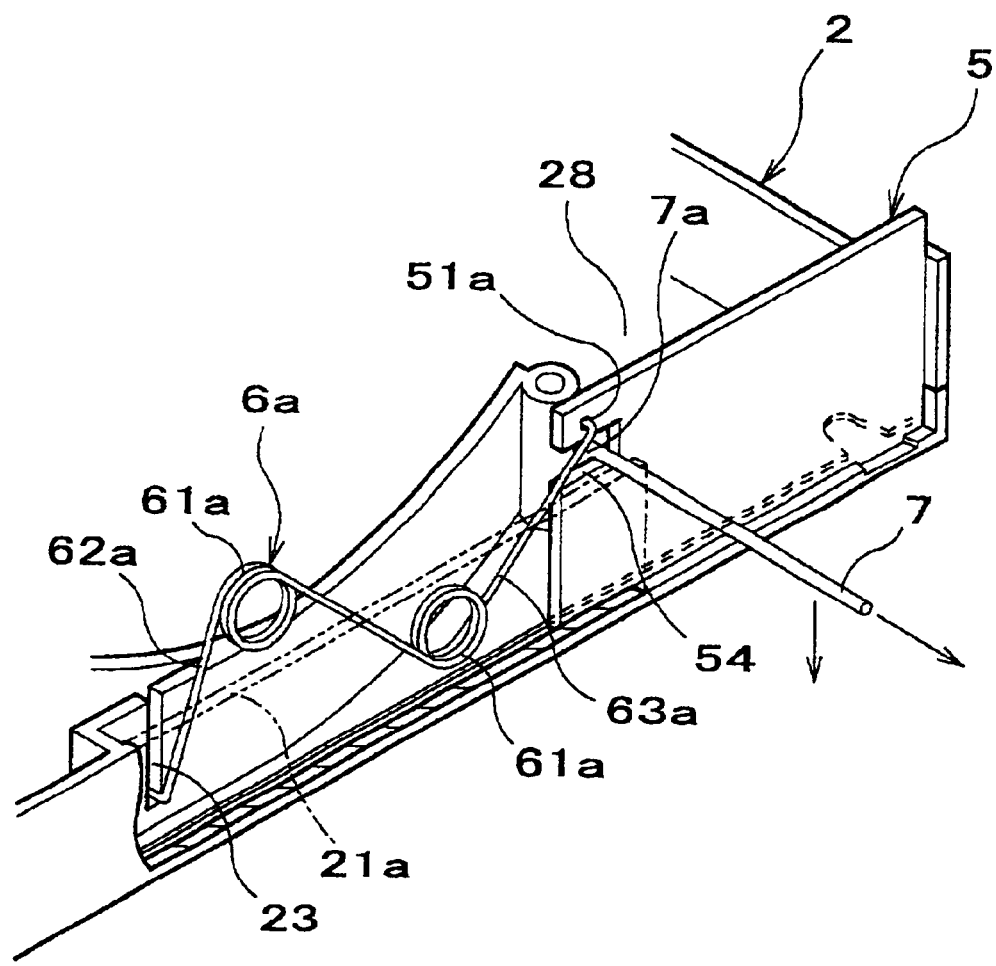
FIG. 20 is an enlarged view showing the vicinity of the sliding door of the magnetic cartridge according to the ninth embodiment.

FIG. 20 is an enlarged view showing the vicinity of the sliding door of the magnetic cartridge according to the ninth embodiment. The sliding door 5 shown in FIG. 20 is approximately rectangle and has a spring hook hole 51a, which is for holding the bent tip of the acting spring arm 63a of a spring member 6a and positioned at the upper portion of the rear end of the sliding door 5 (left direction in FIG. 20). Under the spring hook hole 51a is provided a cutout 54 of U-shape, which is cut from the rear end for pressing the sliding door 5 toward the base 28 of the lower half section 2. The cutout 54 is provided so that the L-shape stick 7 can press the slide door 5 at the possible lowest position, which at the same time should be higher than the side wall 21a. Thus the L-shape stick 7 will be of no interference when the upper half section 3 (see FIG. 17) is mated with the lower half section 2.

The spring member 6 is a torsion coil spring having two coils 61a. A fixing spring arm 62a of the rear end side (left direction in FIG. 20) descends and an acting spring arm 63a of the front end side (right direction in FIG. 20) ascends. The fixing spring arm 62a is held by the spring holder 23 and the acting spring arm 63a is held by the spring hook hole 51a.

The magnetic tape cartridge having the sliding door 5 and the spring member 6 encounters the difficulty that the rear end of the sliding door 5 is liable to be lifted in mating the lower half section 2 with the upper half section 3, since the spring member 6a imposes the force on the sliding door 5 so as to lift the sliding door 5 upward.

After the L-shape stick 7 is inserted into the cutout 54, the sliding door 5 is drawn to the side wall 21a with the holding point 7a as well as pressed toward the base 28 of the lower half section 2. Thus the lifting and falling of the spring member 6a and the sliding door 5 will be prevented. Therefore, if the lower half section 2 and the upper half section 3 is mated this way (see FIG. 20), it will be performed easily.

Tenth Embodiment

Figure 21:
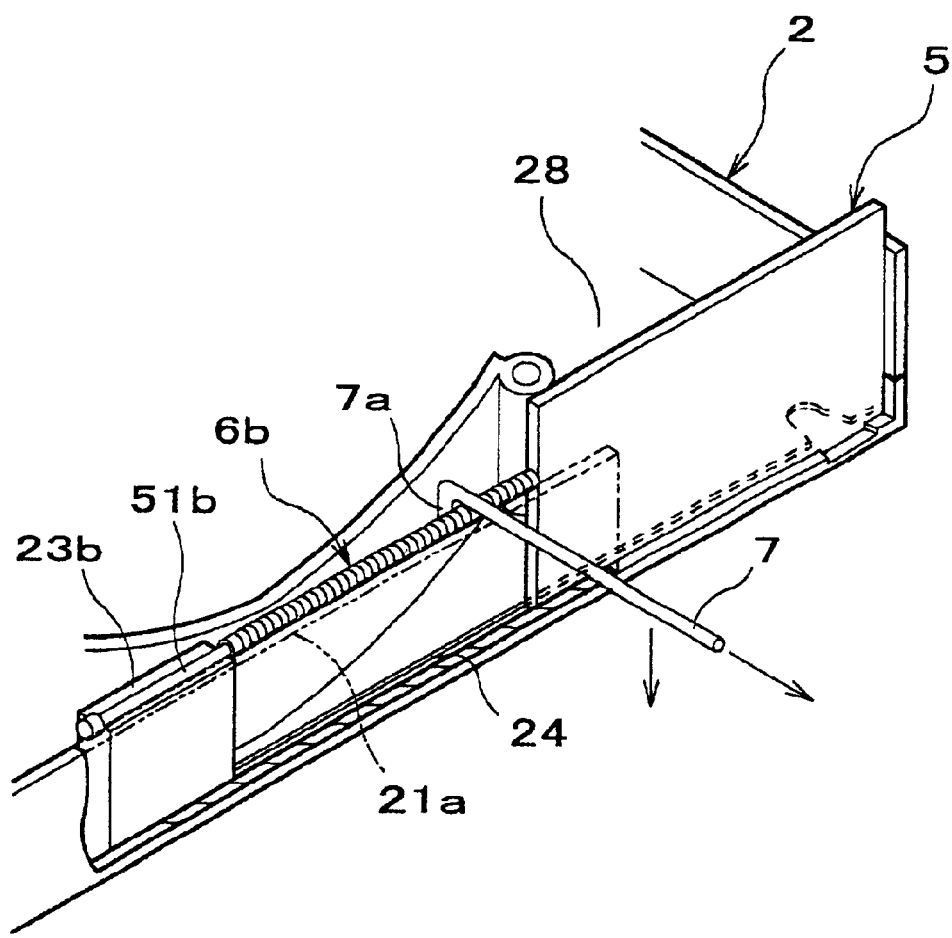
FIG. 21 is an enlarged perspective view showing the vicinity of the sliding door of the magnetic tape cartridge according to the tenth embodiment.

The tenth embodiment will be described. FIG. 21 is an enlarged perspective view showing the vicinity of the sliding door of the magnetic tape cartridge according to the tenth embodiment.

As shown in FIG. 21, according to the tenth embodiment, a spring supporting rod 51, around which a compression coil spring 6b is installed, projects from the middle of the rear end of the sliding door 5 (left direction in FIG. 21). A spring holder 23b for holding the end of the compression coil spring 6b stands on the base 28 of the lower half section 2 in the rear of the lower guide channel 24 (left direction in FIG. 21).

When the magnetic tape cartridge of this type is assembled, the compression coil spring 6b is compressed while the spring supporting rod 51b is slanted and the end of the compression coil spring 6b is held by the spring holder 23b, and the sliding door 5 is gradually dropped to insert into the lower guide channel 24. Under these conditions, if the compression spring 6b is pressed downward, namely toward the base 28 of the lower half section 2 with the L-shape stick 7, and also drawn to the side wall 21a with the holding point 7a hooked on the compression coil spring 6b, the lifting and falling of the sliding door 5 can be prevented. Therefore, if the lower half section 2 and the upper half section 3 is mated this way, it will be performed easily.

Eleventh Embodiment

Figure 22:
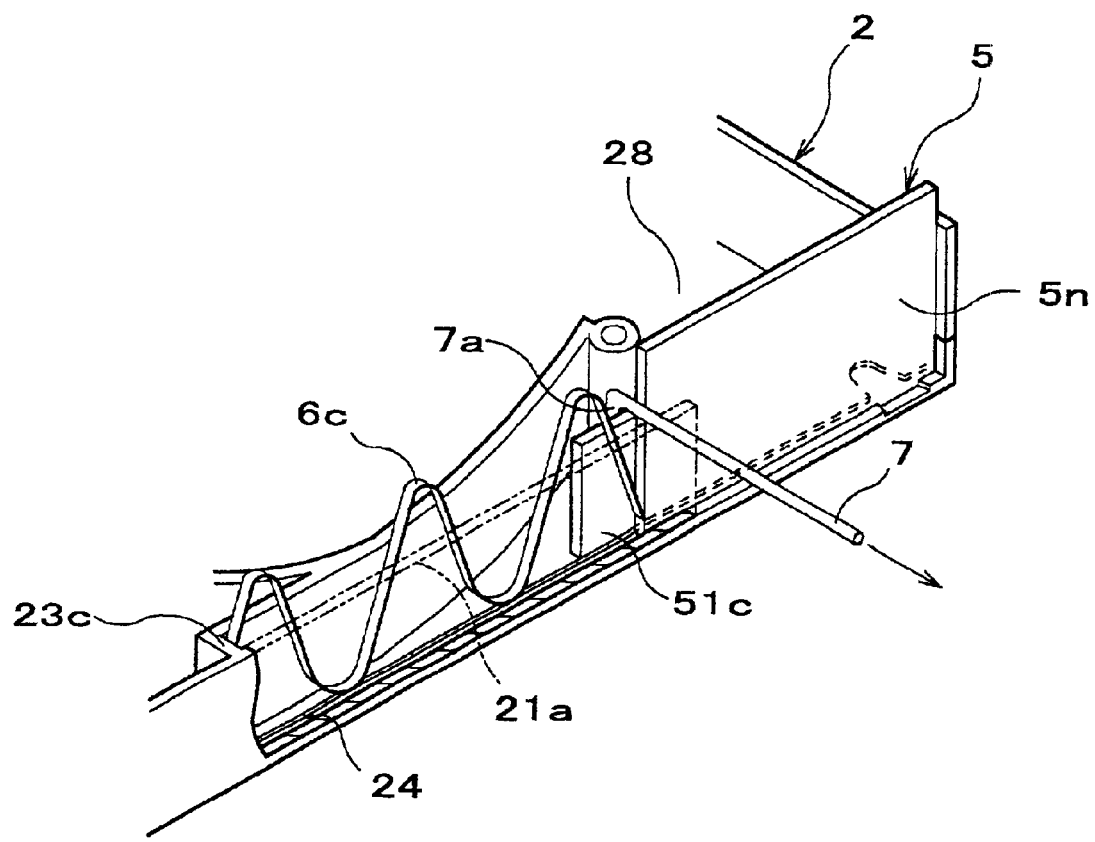
FIG. 22 is an enlarged perspective view showing the vicinity of the sliding door of the magnetic tape cartridge according to the eleventh embodiment.

The eleventh embodiment will be described. FIG. 22 is an enlarged perspective view showing the vicinity of the sliding door of the magnetic tape cartridge according to the eleventh embodiment. As shown in FIG. 22 according to the eleventh embodiment, a leaf spring 6c bent like waves is employed. The sliding door 5 is so arranged that a spring holder 51c of a plate, the height of which is lower than a door portion 5n, is integrated with the door portion 5n of a thin rectangular plate. The front end of the leaf spring 6c (right direction in FIG. 22) is housed between the spring holder 51c and the side wall 21a of the lower half section 2. And the rear end of the leaf spring 6c is held by a spring holder 23c standing at the rear end of the lower guide channel 24, in which the sliding door 5 slides.

When the magnetic tape cartridge of this type is assembled, the rear end of the leaf spring 6c is held by the spring holder 23c and then the sliding door 5 is inserted into the lower guide channel 24 by compressing the leaf spring 6c with the sliding door 5. With the L-shape stick 7, the top of the spring holder 51c is pressed downward, namely toward the base 28 of the lower half section 2, and the spring holder 51c is simultaneously drawn to the side wall 21a of the lower half section 2. Thus the lifting and falling inward of the sliding door 5 and the leaf spring 6c can be prevented, since the leaf spring 6c lies between the side wall 21a and the spring holder 51c. Therefore, when the upper half section 3 is mated with the lower half section 2 with the L-shape stick 7 pressing the spring holder 51c, the magnetic tape cartridge will be assembled easily and securely.

It will now be appreciated from the foregoing description that the present invention is not limited to the particularly illustrated embodiments 8 through 11 discussed above and may be carried out in various modified forms. For example, the position of the spring member or the sliding door, on which the L-shape stick imposes the force, can be selected according to the shapes of the parts.

Twelfth Embodiment

The twelfth embodiment of the invention will now be described in detail.

Figure 23:
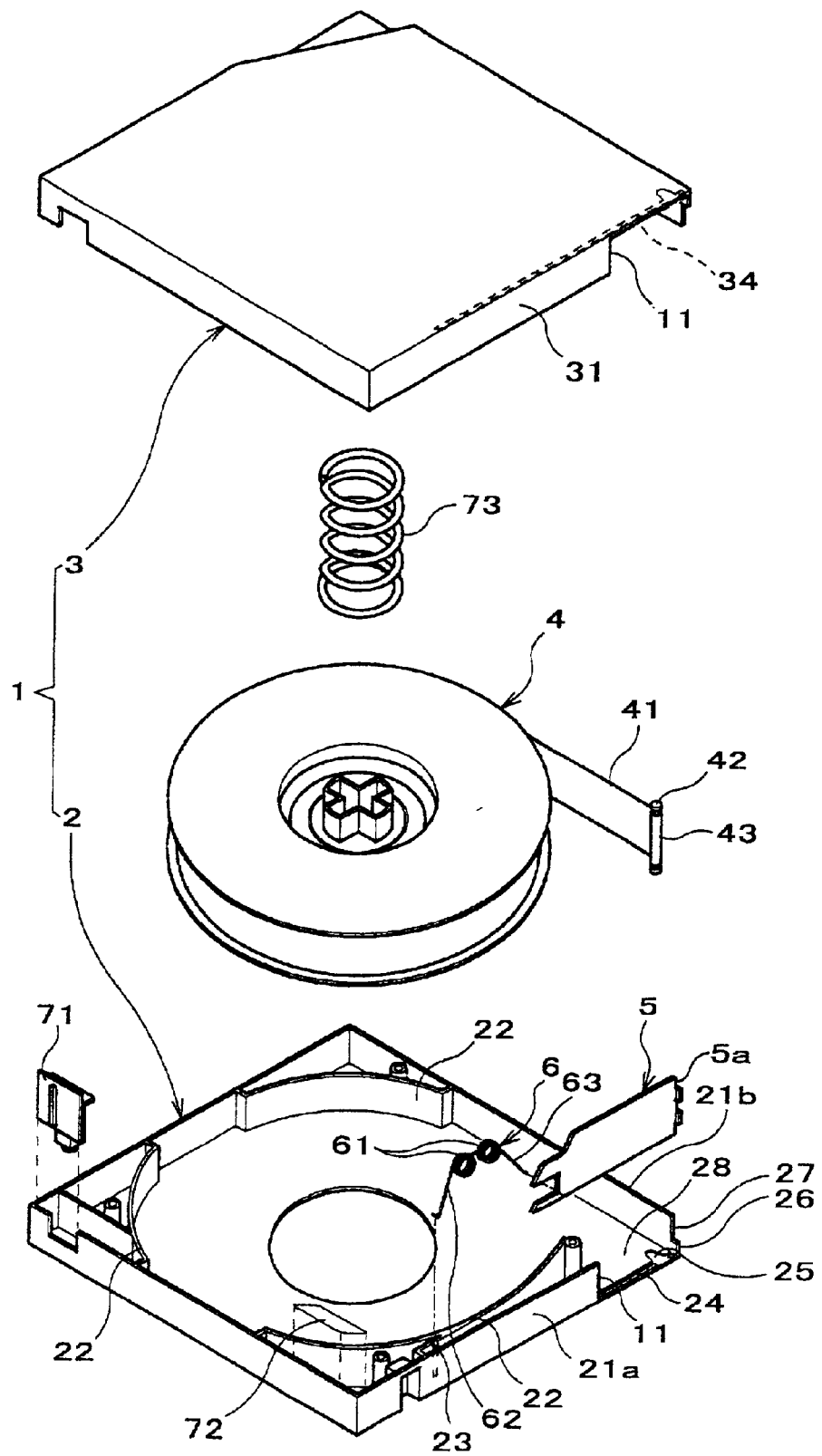
FIG. 23 is an exploded perspective view of the magnetic tape cartridge according to the twelfth embodiment.
Figure 24A:
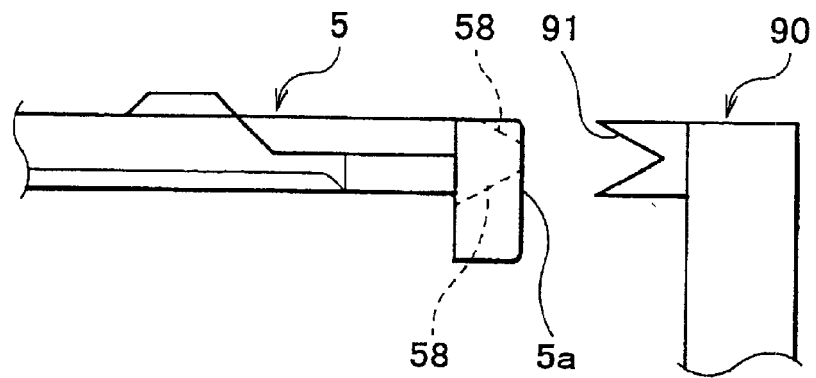
FIG. 24(a) is a top view of the sliding door and the supporting arm and FIG. 24(b) is a perspective view of the sliding door and the supporting arm according to the twelfth embodiment.
Figure 24B:
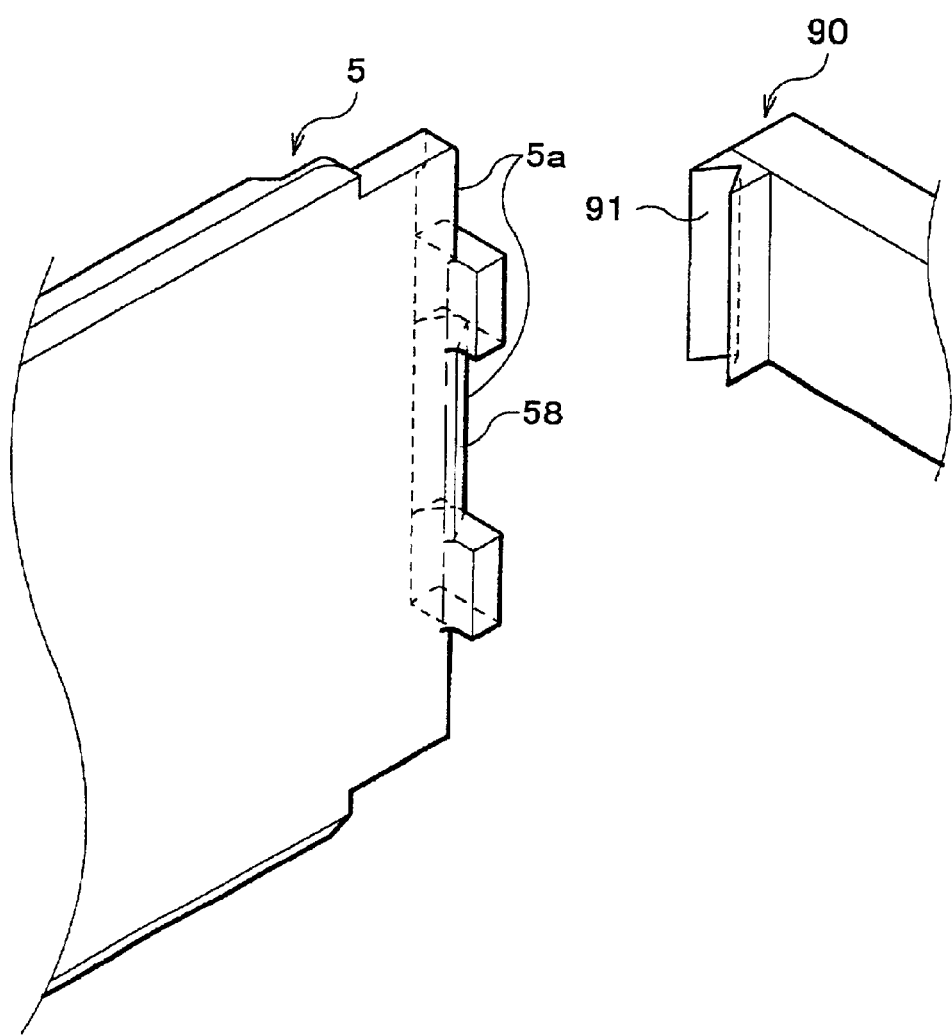

FIG. 23 is an exploded perspective view of the magnetic tape cartridge, FIG. 24(a) is a top view of the sliding door and the supporting arm and FIG. 24(b) is a perspective view of the sliding door and the supporting arm.

As shown in FIG. 23, the magnetic tape cartridge according to the present embodiment is so arranged that the reel 4 wound by the magnetic tape 41, the sliding door 5, the spring member 6, the inadvertent erasing protection claw 71, the IC chip 72 and the compression coil spring 73 are housed in the lower half section 2 and the upper half section 3, which form the cartridge case The opening 11, which lies across the lower half section 2 and the upper half section 3, for extracting the magnetic tape 41 is provided near the corner of the side wall 21a of the cartridge case 1. The opening 11 is opened or closed by the sliding door 5, which slides along the side wall 21a of the lower half section 2 and the side wall 31 of the upper half section 3. The sliding door 5 is continuously pressed by the spring member 6, which is a torsion coil spring with two coils.

The leader pin 42 is clamped at the leading end of the magnetic tape 41 with the clip 43. The leader pin 42 will be held by the tape loading mechanism of a record playback unit, when the record playback unit retracts the magnetic tape 41.

The cartridge case 1 is formed by mating the two parts, the lower half section 2 and the upper half section 3, which include half section of the cartridge case respectively. Reinforcing ribs 22 are so positioned that they may not interfere with the reel 4 on the base 28 of the lower half section 2. The cartridge case is so arranged that the supporting and mounting of parts can be performed with the reinforcing ribs 22.

The lower guide channel 24, referred to as the guide according to the appended claims, is carved on the base 28 so that the sliding door 5 can slide smoothly. The lower guide channel 24 is shallow and guides the sliding door 5 freely along with the upper guide channel 34 of the upper half section 3 to be described later (see FIG. 23). The spring holder 23, which holds the fixing spring arm 62 of the spring member 6, is a vertical slit, which is cut on one of the reinforcing ribs 22 that stands inside the side wall 21a across the lower guide channel 24. A holder 25, which holds the leader pin 42, is provided in the corner inside the lower half section 2. The cutout 27 for introducing the arm, about upper two thirds of the side wall 21b, is provided for the side wall 21b with which the front end 5a of the sliding door 5 interferes, since the arm of a record playback unit needs to press the front end 5a of the sliding door 5 when the record playback unit opens the sliding door 5. The contact member 26, with which the front end 5a of the sliding door 5 is in contact when it is closed, is elevated from the base 28 of the lower half section 2.

The inner surface of the upper half section 3 (not shown) is formed approximately symmetrical with that of the lower half section 2. The upper guide channel 34, which guides the top of sliding door 5, is carved inside the opening 11 along the side wall 31 in parallel with the opposite lower guide channel 24 (see FIG. 23).

Figure 25A:
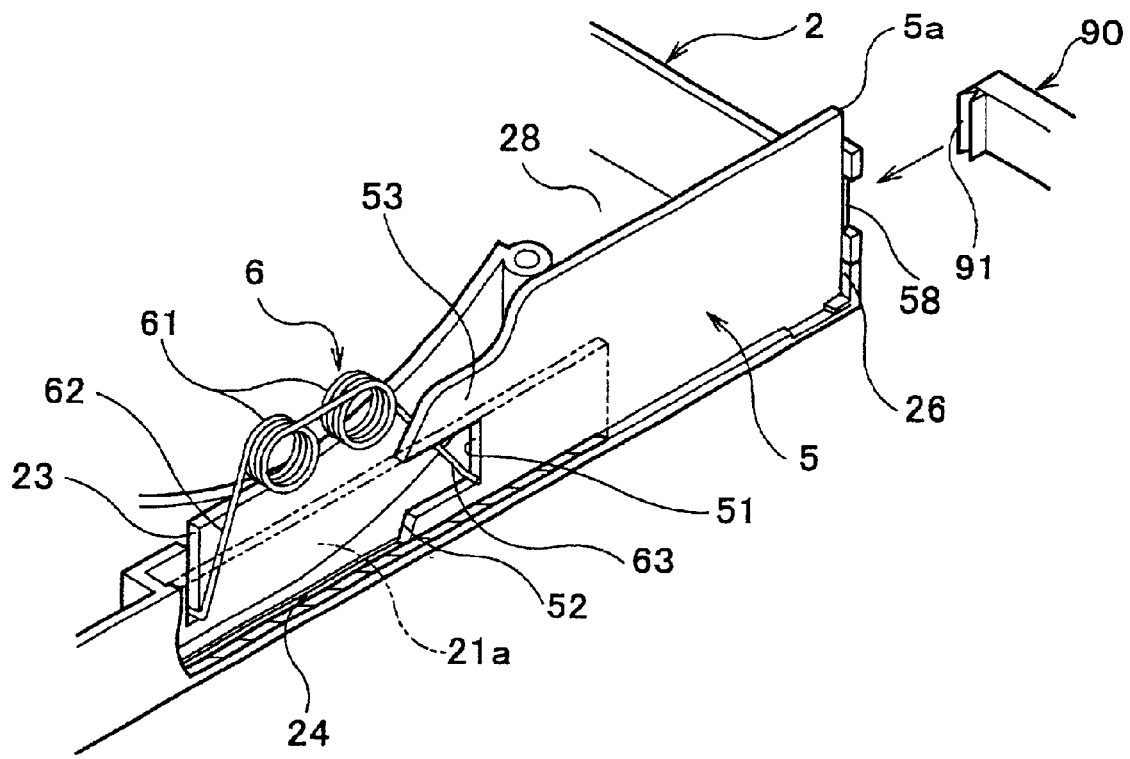
FIG. 25(a) and FIG. 25(b) are the perspective views for explaining the assembly process of the magnetic tape cartridge according to the twelfth embodiment.
Figure 25B:
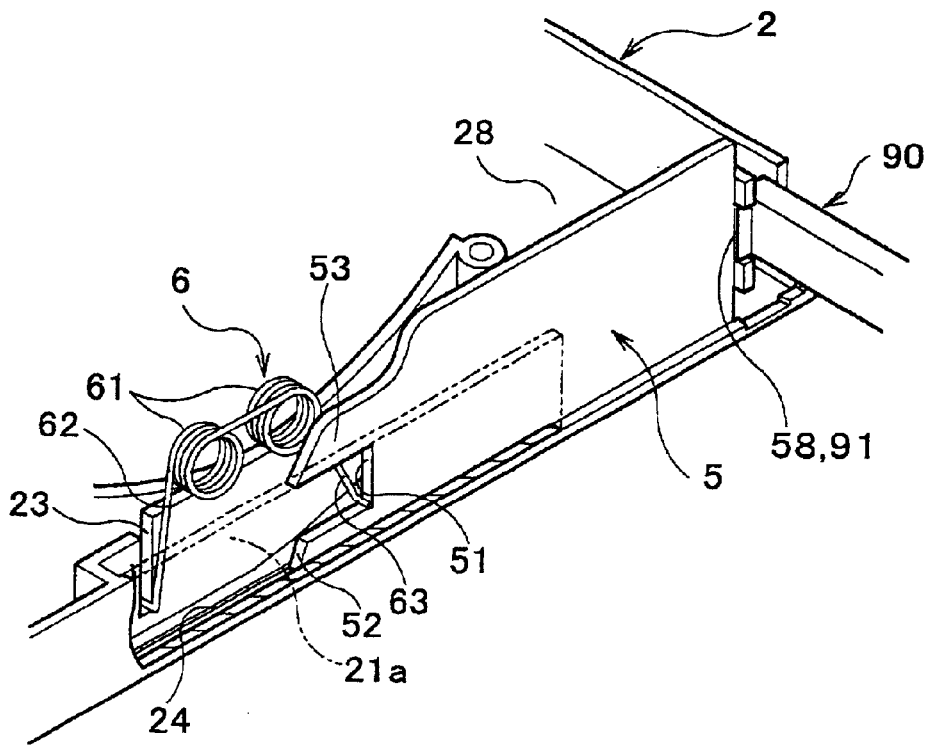

As shown in FIG. 23 and FIG. 25, the spring member 6 is a torsion coil spring having two coils 61. When the spring member 6 is mounted on the lower half section 2, the fixing spring arm 62 of the rear end is held by the spring holder 23 and the acting spring arm 63 is placed in the lower guide channel 24. Subsequently, the sliding door 5 is inserted into the lower guide channel 24, while the acting spring arm 63 is bent by the rear end of the sliding door 5.

The sliding door 5 is a thin rectangular plate, in the rear end of which the spring holder 51 for holding the acting spring arm 63 is formed in a U-shape cutout. The lower portion of the spring holder 51 has the wedge 52 so that the acting spring arm 63 of the spring member 6 may be lifted, when the sliding door 5 is mounted on the lower half section 2 by bending the spring member 6. The projection 53, which protrudes in the opening direction of the sliding door and upper portion of which is cut out so that the coils 61 of the spring member 6 may not interfere with the sliding door 5 when it is opened. The top of the projection 53 is slightly higher than the side wall 21a, thereby exceeding the height of the side wall 21a, when the sliding door 5 is inserted in the lower guide channel 24.

The magnetic tape cartridge of this type is assembled as follows. The sliding door 5 is inserted into the lower guide channel 24 of the lower half section 2 so that the spring member 6 may impose the force on the sliding door 5. The lower half section 2 and the upper half section 3 are mated while the front end 5a of the sliding door 5 is supported by a supporting arm 90, which belongs to an assembly apparatus (not shown). The supporting arm 90 shown in FIG. 24, which comes in contact with approximately half of the front end 5a of the sliding door 5 in the middle and has a V-shape groove 91 facing the front end 5a. The V-shape groove 91, which is positioned in front of the front end 5a, approaches the front end 5a of the sliding door 5, presses the front end 5a and leaves it, when the supporting arm 90 is driven by a one-axis driving means (not shown). Only the portion that comes in contact with the V-shape groove 91 is chamfered with the same slope as that of the V-shape groove 91 to form a chamfered portion 58 on the corners, where the front end 5a of the sliding door 5 and the inner or outer surface of the sliding door 5 meet.

The assembly of the magnetic tape cartridge of this type with the supporting arm 90 will be described now. Any type of assembly can be applied to the magnetic tape cartridge such as the assembly by a man, the assembly with dedicated assembly equipment, or the assembly with an all-purpose robot.

Figure 26A:
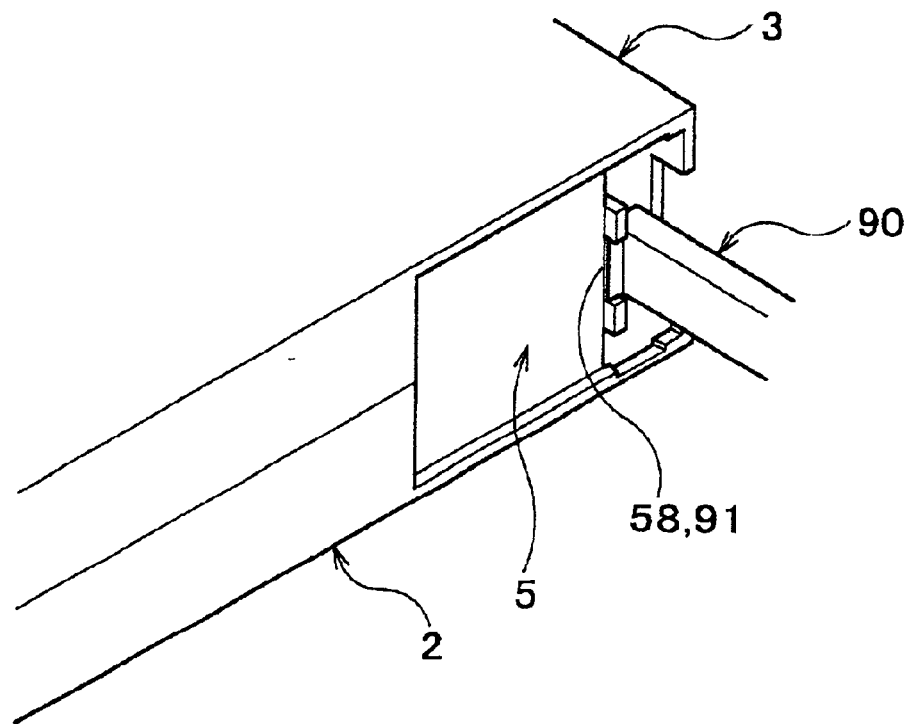
FIG. 26(a) shows the start of the upper half section mating and FIG. 26(b) shows the completion of it.
Figure 26B:
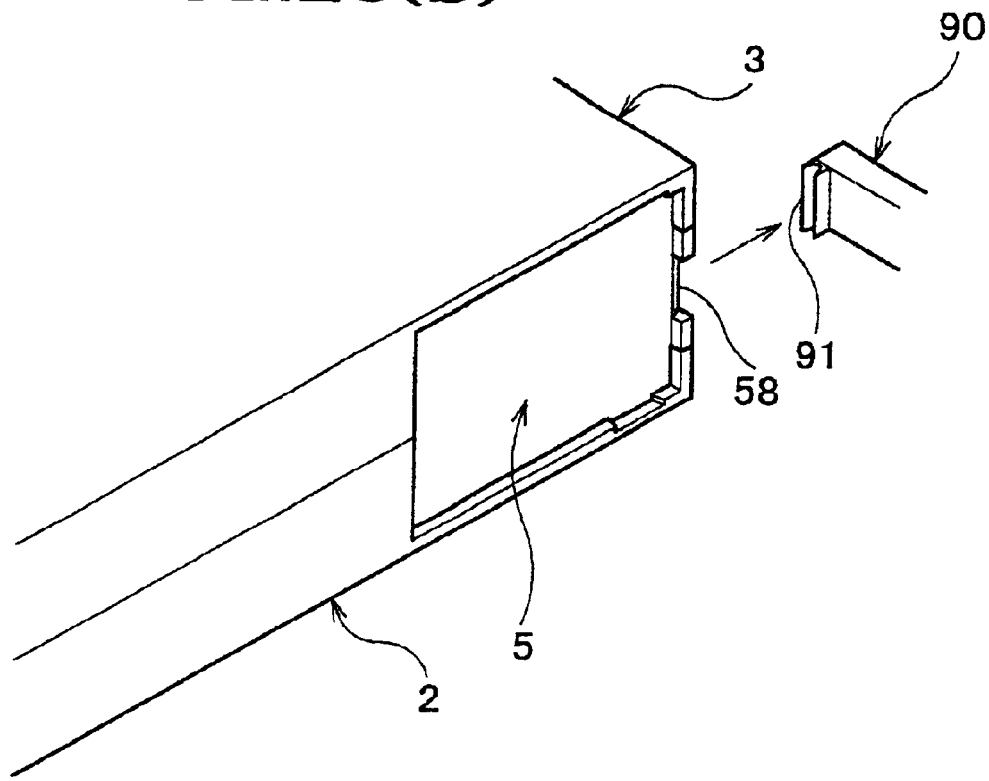

FIG. 25 and FIG. 26 are for explaining the assembly process of the magnetic tape cartridge according to this embodiment. As described before, the fixing spring arm 62 of the spring member 6 is held by the spring holder 23 and the acting spring arm 63 is set in the lower guide channel 24. Next, the sliding door 5 is placed inside the side wall 21a tilted with the wedge 52 downward and the sliding door 5 is carried to the acting spring arm 63. After the wedge 52 hits the acting spring arm 63, the wedge 52 is continued to slide in the lower guide channel 24, bending the spring member 6. Then when the load of the spring member 6 reaches a given value, the acting spring arm 63 is lifted by the wedge 52 and held by the spring holder 51. When the spring member 6 is compressed till the whole sliding door 5 is ready for being inserted into the lower guide channel 24, the sliding door 5 is dropped to insert into the lower guide channel 24. The sliding door 5 will stand still if no external force acts, since the sliding door 5 is pressed to the contact member 26 by the force imposed by the spring member 6 (see FIG. 25(*a*)). However, the sliding door 5 may possibly be lifted and off the lower guide channel 24 by small force such as vibration, since the spring member 6 and the sliding door 5 are unstable due to the fact that the force acting on the sliding door 5 by the spring member 6 is supported only by the small contact member 26 standing on the base 28 of the lower half section 2. Also the sliding door 5 is liable to fall inward the lower half section 2, for the sliding door 5 is supported only by the side wall 21a and the shallow lower guide channel 24 in the direction normal to the plane of the sliding door 5 (thickness direction).

In order to solve the problem mentioned above, the supporting arm 90 is brought closer in a parallel movement in front of the sliding door 5 and the V-shape 91 of the supporting arm 90 is in contact with the chamfered portion 58. Moving the supporting arm 90 further in the opening direction of the sliding door, the sliding door 5 is opened. When the sliding door 5 is opened by one third approximately, the supporting arm 90 is stopped.

Thus the sliding door 5 is pressed against the V-shape groove 91 with the force imposed by the spring member 6. The sliding door 5 will be supported to stand normal to the base 28 of the lower half section 2 securely, since the chamfered portion 58 of the sliding door 5 is inserted into the V-shape groove 91 deeply.

The upper half section 3 is mated with the lower half section 2 while the front end 5a of the sliding door 5 is supported by the supporting arm 90 (see FIG. 26(*a*)). The sliding door 5 will be inserted into the upper guide channel 34 of the upper half section 3 securely, since the front end 5a of the sliding door 5 is supported by the supporting arm 90 as described above. Subsequently, the supporting arm 90 is moved in the closing direction of the sliding door 5 in a parallel movement and detached from the front end 5a, which will complete the mating of the lower half section 2 and the upper half section 3 (see FIG. 26(*b*)).

In this manner, the magnetic tape cartridge can be assembled easily and securely by mating the upper half section 3 with the lower half section 2 supporting the sliding door 5 by the V-shape groove 91.

Next, the application of the method for assembling the magnetic tape cartridge according to the present invention to another type of magnetic tape cartridges will be described. In the following the detailed description would be omitted for the items, which are the same as those according to the twelfth embodiment, bearing the same symbols.

Thirteenth Embodiment

Figure 27:
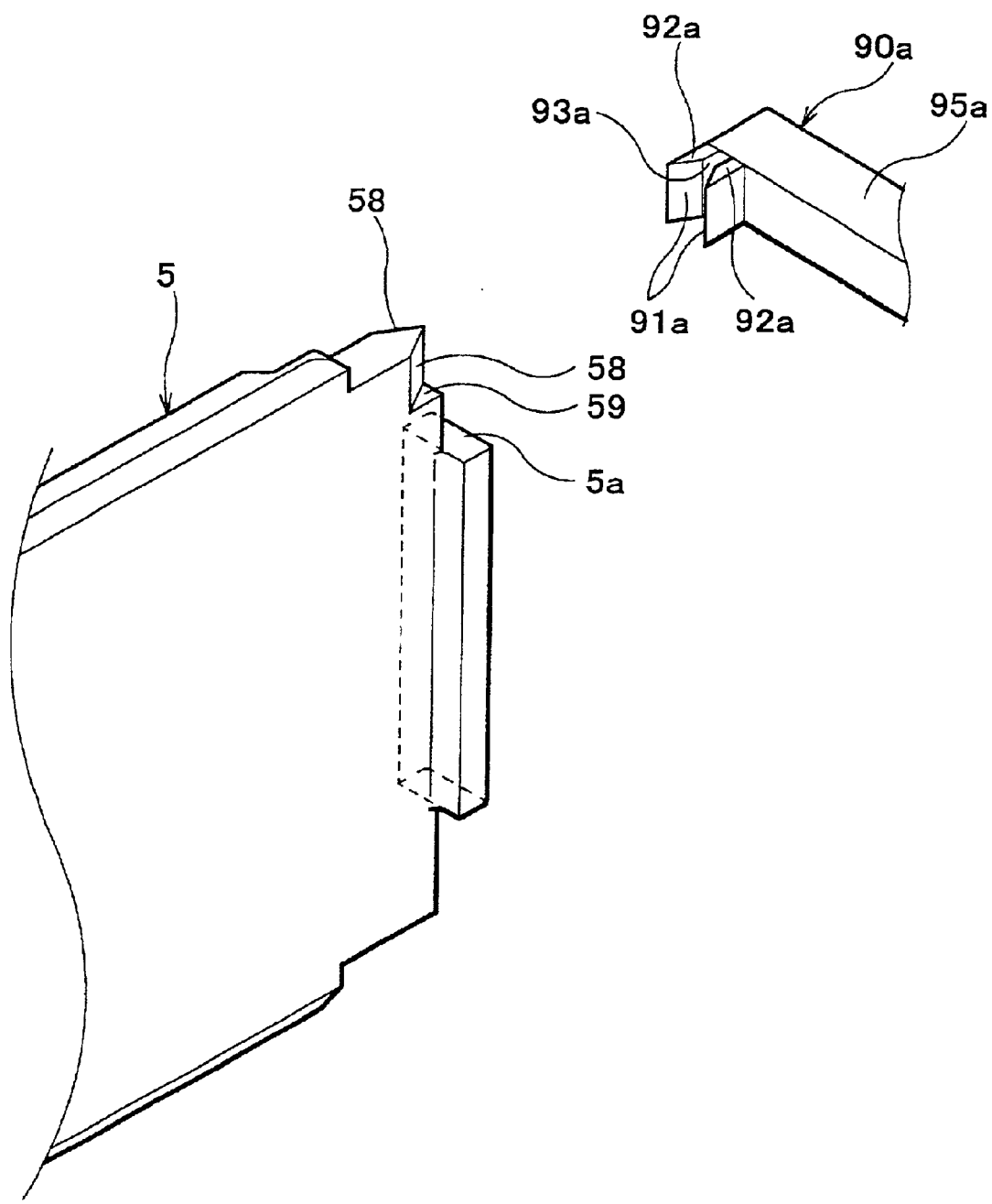
FIG. 27 is an enlarged perspective view showing the sliding door and the supporting arm according to the thirteenth embodiment.

FIG. 27 is an enlarged perspective view showing the sliding door and the supporting arm according to the thirteenth embodiment. As shown in FIG. 27, the sliding door 5 has the chamfered portion 58 only in the vicinity of the top of the front end 6a. The chamfered portion 58 has the sharp edge, as the chamfering is performed up to the center of the thickness of the sliding door 5 leaving no flat area at the end. There formed a step 59 between the chamfered portion 58 and its lower neighboring portion without chamfering. A supporting arm 90a has a V-shape groove 91a, which faces the chamfered portion 58. The V-shape groove 91a is formed by fixing two slope parts 92a of trapezoidal cross section spaced on the front end of an arm 95a. A groove 93a is formed in the bottom of the V-shape.

The supporting arm 90a will prevent the sliding door 5 from falling in the direction normal to its plane by supporting the front end 5a of the sliding door 5, thus enabling an easy and secure mating of the lower half section 2 and the upper half section 3. According to this embodiment, the lifting of the sliding door 5 is prevented, since the vertical displacement of the sliding door 5 is restricted in such a way that the step 59 hits the slope parts 92a, while the sliding door 5 is supported by the supporting arm 90a. Therefore, the lower half section 2 and the upper half section 3 can be mated more securely, since the sliding door 5 is prevented from being off the lower guide channel 24 during the mating.

Fourteenth Embodiment

The fourteenth embodiment of the present invention will now be described.

Figure 28A:
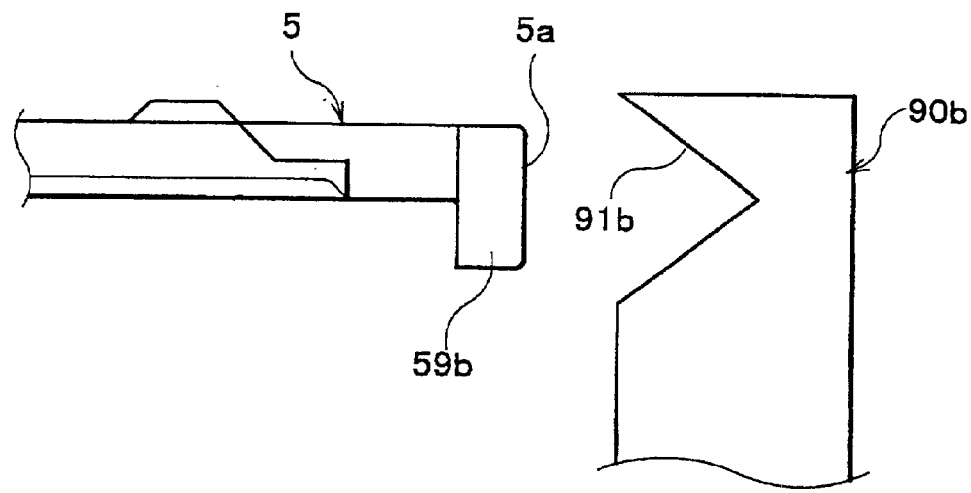
FIG. 28(a) is a top view and FIG. 28(b) is a perspective view.
Figure 28B:
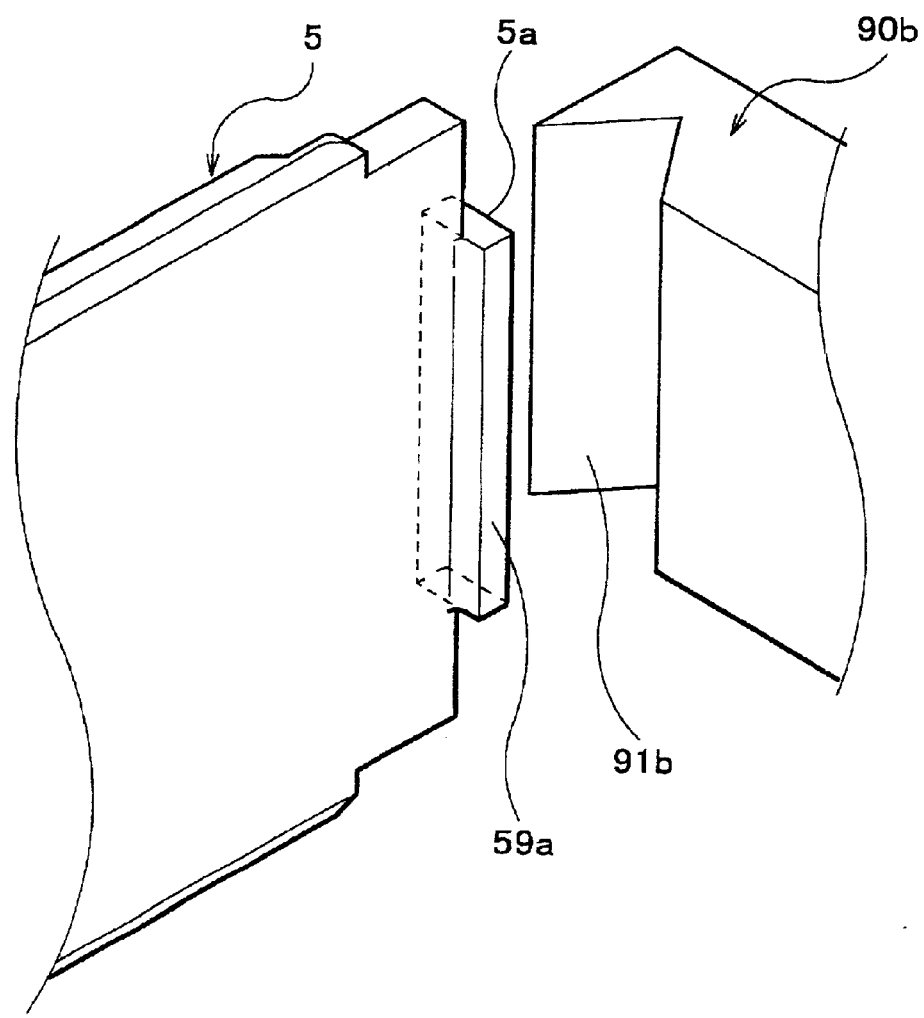
Figure 29:
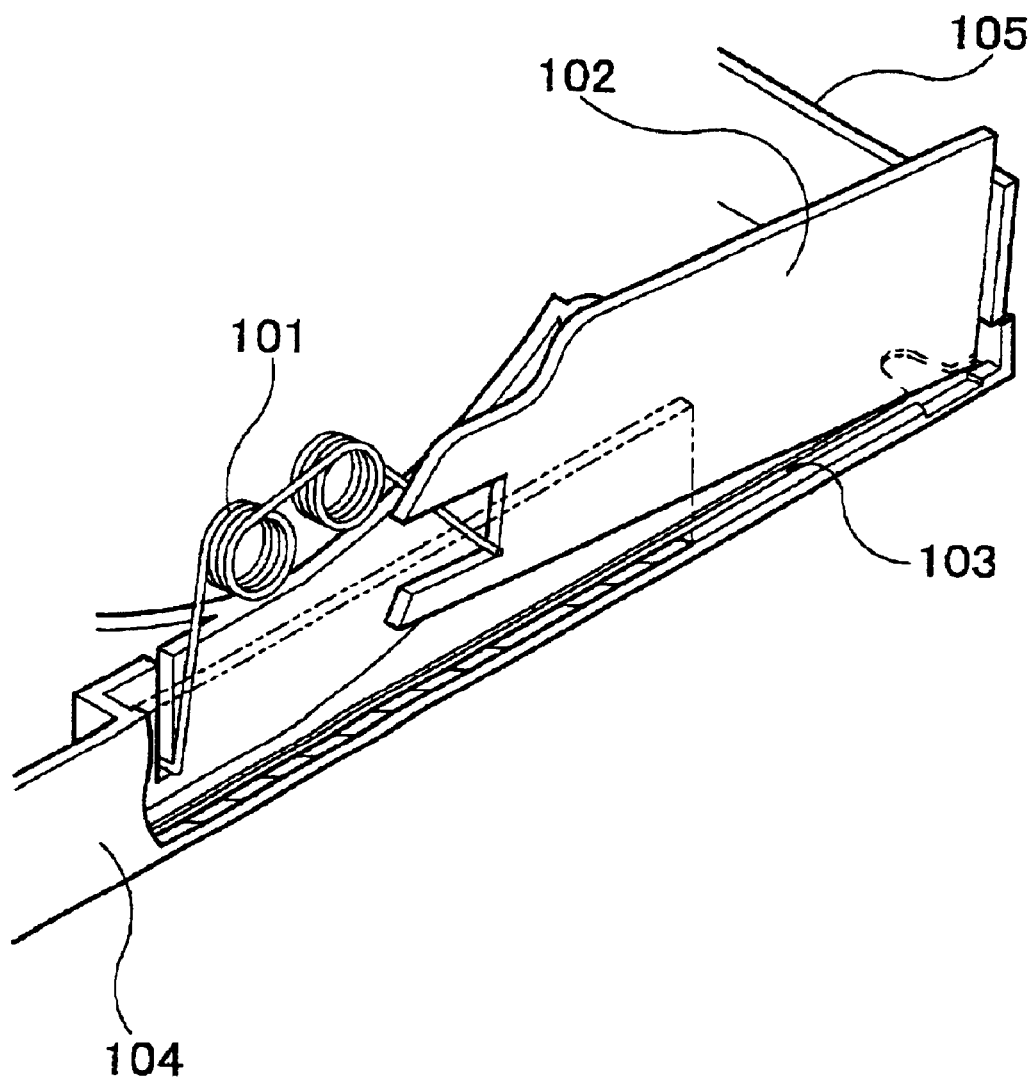
FIG. 29 is an enlarged perspective view showing the vicinity of the sliding door inserted in the lower guide channel, according to the prior magnetic tape cartridge.
Figure 30:
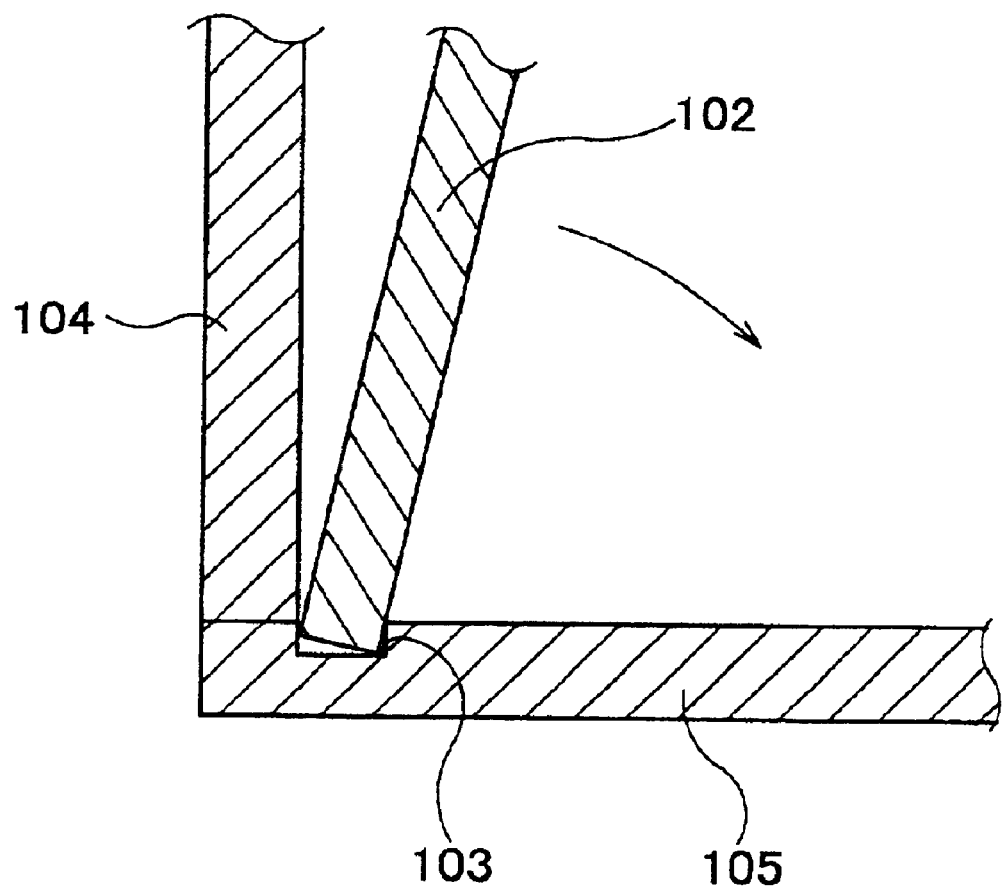
FIG. 30 is an enlarged section view showing the vicinity of the sliding door inserted in the lower guide channel, according to the prior magnetic tape cartridge.

FIG. 28 is an enlarged view showing major parts of the sliding door 5 and a supporting arm 90b according to the fourteenth embodiment of the invention: FIG. 28(a) is a top view and FIG. 28(b) is a perspective view.

As shown in FIG. 28(a) and FIG. 28(b), the sliding door 5 has a knob 59a, which is the rib placed in the middle of the front end 5a projecting outward from the cartridge case 1. This fourteenth embodiment doesn't have the chamfered portion 58 different from the twelfth and thirteenth embodiments. A V-shape groove 91b, the width of which is larger than the combined thickness of the sliding door 5 and the knob 59a, is formed on the supporting arm 90b facing the front end 5a.

A combination of the sliding door 5 and the supporting arm 90b enables an easy mating of the lower half section 2 and the upper half section 3, since the front end 5a of the sliding door 5 is supported by the supporting arm 90b so that the sliding door 5 stands stably inserted in the V-shape groove 91a while the spring member 6 imposes the force on the sliding door 5. In this embodiment, the sliding door 5 cannot be opened by moving the supporting arm 90b straight to the sliding door 5 from its front because the width of the V-shape groove 91b is wider than that of the sliding door 5. So it is necessary to move the supporting arm 90b diagonally or in an arc from the outside of the cartridge case 1 so as to position the V-shape groove 91b in front of the front end 5a, while the sliding door 5 is opened by another assembly support equipment.

It will now be appreciated from the foregoing description that the present invention is not limited to the particularly illustrated embodiments 12 through 14 discussed above and may be carried out in various modified forms. For example, the shapes of the spring member and the sliding door are not limited to what have been exemplified. Any type will be applicable so long as it has the mechanism that the spring member imposes force on the sliding door in the closing direction.

What is claimed is:

1. A method for assembling a magnetic tape cartridge, which comprises an opening, which is positioned on a side of a cartridge case lying across a lower half section and an upper half section of the cartridge case, for extracting a magnetic tape, and a sliding door for opening or closing the opening, which is inserted in a closed position with force imposed by a spring member into lower and upper guides placed in the lower half section and the upper half section of the cartridge case respectively, the method comprising the steps of:

inserting said sliding door into said lower guide of the lower half section while said spring member is compressed; and mating the upper half section with the lower half section while said spring member or said sliding door is pressed toward a base of the lower half section.

2. The method for assembling a magnetic tape cartridge according to claim 1, wherein the upper half section is mated with the lower half section while said spring member or said sliding door is pressed to a side wall of the lower half section and toward the base of the lower half section simultaneously.

* * * * *